US007450497B2

(12) United States Patent
Trudel et al.

(10) Patent No.: US 7,450,497 B2
(45) Date of Patent: Nov. 11, 2008

(54) SHARED MESH SIGNALING METHOD AND APPARATUS

(75) Inventors: Richard Trudel, Ile Bizard (CA); Evert E. de Boer, Nepean (CA); James A. Shields, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1153 days.

(21) Appl. No.: 10/195,448

(22) Filed: Jul. 16, 2002

(65) Prior Publication Data
US 2004/0190444 A1 Sep. 30, 2004

Related U.S. Application Data

(63) Continuation of application No. 10/059,344, filed on Jan. 31, 2002, now Pat. No. 6,917,759.

(51) Int. Cl.
*H04L 12/26* (2006.01)
*H04L 12/28* (2006.01)
*H04L 12/56* (2006.01)

(52) U.S. Cl. .................................. 370/224; 370/406

(58) Field of Classification Search ................ 370/216, 370/217, 221, 222, 406, 410, 463, 223, 224, 370/227, 228
See application file for complete search history.

(56) References Cited

U.S. PATENT DOCUMENTS

| | | | | |
|---|---|---|---|---|
| 5,550,805 A | * | 8/1996 | Takatori et al. | ............ 370/222 |
| 5,793,745 A | | 8/1998 | Manchester | |
| 6,009,075 A | | 12/1999 | Roberts | |
| 6,049,523 A | * | 4/2000 | Anderson et al. | .......... 370/217 |
| 6,195,367 B1 | * | 2/2001 | Jakobik et al. | ............. 370/535 |
| 6,848,062 B1 | * | 1/2005 | Desai et al. | ..................... 714/4 |

(Continued)

FOREIGN PATENT DOCUMENTS

EP 1 134 922 9/2001

Primary Examiner—Edan Orgad
Assistant Examiner—Blanche Wong
(74) Attorney, Agent, or Firm—Jeffrey M. Measures; Borden Ladner Gervais LLP

(57) ABSTRACT

In a mesh network, a network element for providing protection switching in a 1:N shared mesh protection scheme having a first protection path associated with a pair of working paths selected from the N working paths is disclosed. The network element comprising: (a) a link for connecting the network element to a first working path of the pair of working paths in a path layer of the network, the path layer including a plurality of interconnected network elements; (b) a routing table accessible by the network element, the routing table for having local protection channel information associated with a local protection segment separate from the first protection path, the local protection segment connecting the network element and one of the interconnected network elements adjacent to the network element; and (c) an identification module for using the local protection channel information to identify an available protection channel on the local protection segment in the event of failure of a local working segment of the first working path, the local working segment connecting the network element and said one of the adjacent interconnected network elements; wherein the available local protection channel on the local protection segment is used to switch local network bandwidth from the failed local working segment to the local protection segment after the failure has been detected. Selection functions are also disclosed.

29 Claims, 13 Drawing Sheets

U.S. PATENT DOCUMENTS

| | | | |
|---|---|---|---|
| 6,934,248 B1 * | 8/2005 | DeBoer et al. | 370/217 |
| 6,992,975 B1 * | 1/2006 | Daniel et al. | 370/222 |
| 2001/0015955 A1 * | 8/2001 | Suzuki | 370/217 |
| 2002/0089712 A1 * | 7/2002 | Kang et al. | 359/110 |
| 2004/0190444 A1 * | 9/2004 | Trudel et al. | 370/224 |

* cited by examiner

SHARED MESH SIGNALING METHOD AND APPARATUS

This is a continuation of U.S. patent application Ser. No. 10/059,344, filed Jan. 31, 2002 now U.S. Pat. No. 6,917,759

The present invention relates to optical communication systems and, in particular, to apparatus and methods for providing protection signaling between network elements.

BACKGROUND OF THE INVENTION

Optical communication systems have become widely implemented in todays telecommunication networks. The Synchronous Optical Network (SONET) is a standard for Synchronous Telecommunication Signals used for optical transmission based on the synchronous digital hierarchy (SDH). SONET can provide the ability to combine and consolidate traffic through grooming, and can reduce the amount of back to back multiplexing in providing transport services for ATM, SMDS, and Frame Relay, etc. Furthermore, network providers can use SONET network features to reduce the operation costs of the transmission network. The next generation of optical networks may be the optical transport network (OTN) standard.

The network standards are ANSI T1.105 for SDH and Bellcore GR-253-CORE for SONET, which define the physical interface and optical line rate known as the optical carrier (OC) signals, a frame format, and an OAM Protocol. In operation of the SONET system, user signals are converted into a standard electrical format called the Synchronous Transport Signal (STS), which is the equivalent of the optical signal. A single optical channel operates and transmits data according to a high speed synchronous digital hierarchy standards, such as the SONET OC-3, OC-12, and OC-48 rate protocols, which carry rates equivalent to tens of thousands of voice calls. Accordingly, it is critical in todays optical communication systems to provide and maintain the integrity of data communication networks even during problem time periods, due to the large number of transmissions that can be interrupted.

The increased capacity of optical fibre has raised concerns about the reliability and survivability of an optical network, since a single cable cut or equivalent malfunction can impact a large amount of data traffic. Cable cuts can be frequent and almost impossible to avoid, caused by human error or inclement weather. Furthermore, equipment failures resulting from man made or natural disasters are additional possibilities. Accordingly, optimized protection signaling systems and methods are desired in order to quickly re-establish network communications once failures have been detected.

Two types of failures can be experienced in a telecommunication network, such as line failures and module failures. The basic telecommunication network structure consists of various links situated between corresponding transmitters and receivers, which are also referred to as modules. Accordingly, a line failure can include damage to the physical fibre and optical components, such as the malfunction of amplification equipment situated along the optical data path. In contrast, the module failure can consist of the transmission or reception equipment, such as a laser diode transmitter. It should be noted that both line failures and module failures may disable the network segment or link between two adjacent nodes. It is therefore required in todays telecommunication network systems to provide restoration techniques to restore the interrupted traffic temporarily until the detected failure is repaired. One such protection system currently in use is line protection.

One known line protection system is Bi-direction Line Switched Ring systems (BLSR), which have the advantage of relatively fast speed protection circuitry. These ring systems consist of a plurality of nodes coupled in a ring by two multiplexed communication paths, which provide data transmission in opposite directions around the ring. In the presence of a fault such as a fibre cut, the BLSR system detects the presence of this failure in the two nodes immediately adjacent the fault and the communications are maintained via both paths forming the closed loop. The communication signals are therefore transmitted along the two paths from the two nodes adjacent to the fault. The BLSRs are currently used in Backbone networks and are therefore built for higher data transfer rates such as the OC-12/48 Further BLSR protection systems can include 4F and 2F implementations.

One disadvantage with BLSR systems is that they can not be easily applied to already existing (synchronous or asynchronous) communication systems without requiring costly equipment upgrades, for example a change in wavelength or bit rate involves a change in equipment. In addition, BLSR systems have disadvantages in that they do not provide for 1:N protection (i.e. protection of N working paths using at least one shared protection link) since path deployment is typically designated as 50% working and 50% protection, however as BLSR does not support Timeslot Interchange (TSI), the actual efficiency of the working bandwidth is about three quarters of the designated 50% deployment. Furthermore, BLSR systems can have an additional limitation that all nodes around the ring must be of the same type and must have the same capacity One technique that has been tried in order to remove the problems of the BLSR design is a mesh protection design. In a full mesh design, each network element within a network is coupled to every other network element. On a partial mesh design, less optical carrier links are utilized. Well known mesh techniques have an advantage in terms of minimising the requirements for dedicated protection link bandwidth, since the optical bandwidth used for protection is only assigned to a protection link (or protection path having a series of links) during a failure situation, hence reducing the cost of additional fibre and providing greater network flexibility. However, one key problem with these well known mesh designs is the amount of time that is required to locate and establish the required protection link and a subsequent new working path after a failure occurs. The time it takes to re-establish communications after failure is critical since the time period during protection switching and protection link establishment should be small enough so as to practically unnoticeable the devices or people transmitting/receiving the data traffic. These systems typically use the control layer of the network to assist in protection switching, which can provide undesirable protection switching times on the order of seconds. Accordingly, alternative protection signaling systems and methods are desired to potentially reduce the switching times by an order of magnitude.

A further solution to address the desirability of fast protection times is to provide switching at the line level between adjacent network elements. This type of system could probably provide times in the 50 msec range, however would require protection bandwidth to be made available between every network element which would add to the complexity of the network architecture. Another solution could be to use the signaling network to do the switching, which could provide flexibility of sharing bandwidth between adjacent network elements. However, this method of using the signaling network has a disadvantage due to the processing of network overhead, whereby desirable protection times of less than 300 msec may not be achievable consistently. Accordingly, alternative protection signaling systems and methods are desired to reduce switching times, without substantially increasing network architecture and/or overhead processing.

A further disadvantage of present mesh protection schemes is that once a shared protection link is assigned to help provide protection backup to a particular working path, the remaining working paths associated with the shared protection link typically become unprotected. The process of implementing nodal/path diversity for the mesh network can help alleviate some of the risk involved with using a shared protection link between multiple working paths. However, there is a possibility of two unrelated failures occurring on separate working paths, thereby resulting in the undesirable situation of the two working paths competing to acquire usage of the one common shared protection link.

Another disadvantage of current mesh protection schemes is that both working paths and protection paths (having a plurality of protection links) are defined from the source node to the termination node. Therefore, once selected, the entire protection pathway consisting of multiple protection channels or timeslots is assigned to accommodate any transmissions originally destined over the failed working path. This symmetrical assignment of protection capacity can result in an inefficient use of available bandwidth on the protection path, as some of the protection capacity assigned is typically not used by the traffic demands when transferred from the failed working path.

It is an object of the present invention to provide a protection signaling system in a shared mesh environment to obviate or mitigate some of the above-presented disadvantages.

SUMMARY OF THE INVENTION

The present invention is directed to both local and global implementations of a shared mesh protection scheme for defining an associated protection link when a working connection is established. The shared protection link is used to help protect data traffic in working paths, in the event a network failure of the working paths is detected in a mesh network. Currently, there are flexibility, bandwidth efficiency, and undesirable set-up period problems with existing mesh protection schemes. In the present invention, during implementation of the global protection scheme, the corresponding protection path information is sent down to switch cards of network elements making up the protection path, which consists of a series of protection links including one or more shared protection links. It is recognized that the protection path can be composed of one shared protection link. The protection path information is contained within interrupt driven overhead bytes to provide for failure detection and protection path set-up in a path layer of the mesh network.

Upon detection of the failure, the network elements use overhead byte messages to implement local protection switching and switch selection on an available local protection segment or link. In the event local protection switching is not available, global protection switching can use a particular overhead byte message format to inform the routing source network element of the failure in the working path. The messages contain a failure indicator. The routing source network element sends the corresponding overhead byte messages down the defined protection path to provide for protection path establishment according to preloaded data associated with the switch cards of the affected network elements. This preloaded data is contained in a routing table that is locally accessible by the network elements in the path layer. Once the failure has occurred and has been indicated to a source network element, the source element sends protection signaling messages using the overhead bytes to the corresponding network elements along the protection path. Accordingly, the routing tables located at the switch cards of the network elements, set-up when the working path connections were initially established, determine this dynamically allocated protection path environment. Therefore, based on the information contained in these tables, the actual protection path is established upon receiving the ACK from the termination node of the failed working path transmitted along the now established protection path. It is noted that interrupt driven overhead bytes for network traffic are used to provide for protection times of less than 300 msec.

According to the present invention there is provided a network element for providing protection switching in a 1:N shared mesh protection scheme having a first protection link associated with a pair of working paths. The network element comprises: a link for connecting the network element to a first working path of the pair of working paths selected from the N working paths in a path layer of the network, the path layer adapted to include a plurality of interconnected network elements for providing the first protection link associated with the pair of working paths, a routing table accessible by the network element, the routing table for having local protection channel information associated with a local protection segment separate from the first protection link, the local protection segment adapted to connect the network element and one of the interconnected network elements adjacent to the network element; and an identification module for using the local protection channel information to identify an available protection channel on the local protection segment in the event of failure of a local working segment of the first working path, the local working segment adapted to connect the network element and the one of the adjacent interconnected network elements; wherein the available local protection channel on the local protection segment is used to switch local network bandwidth from the failed local working segment to the available local protection segment after the network failure has been detected.

According to a further aspect of the present invention there is provided a method for providing protection switching in a 1:N shared mesh protection scheme having a first protection link associated with a pair of working paths. The method comprises the steps of interconnecting a network element to a first working path of the pair of working paths selected from the N working paths in a path layer of the network, the path layer adapted to include a plurality of interconnected network elements for providing the first protection link associated with the N working paths, defining a routing table accessible by the network element, the routing table having local protection channel information associated with a local protection segment separate from the first protection link, the local protection segment connecting the network element and one of the interconnected network elements adjacent to the network element; identifying by the network element a failure of a local working segment of the first working path, the local working segment connecting the network element and the one of the adjacent interconnected network elements; using the local protection channel information by the network element to identify an available protection channel on the local protection segment; and switching local network bandwidth from the failed local working segment to the available local protection channel on the local protection segment.

According to a still further aspect of the present invention there is provided a computer program product for providing protection switching in a 1:N shared mesh protection scheme having a first protection link associated with a pair of working paths. The product comprises computer readable medium; a first link module stored on the computer readable medium for connecting a network element to a first working path of the pair of working paths selected from the N working paths in a path layer of the network, the path layer adapted to include a plurality of interconnected network elements for providing the first protection link associated with the pair of working paths; a routing module stored on the computer readable medium and accessible by the network element, the routing module for storing local protection channel information associated with a local protection segment separate from the first protection link, the local protection segment adapted to connect the network element and one of the interconnected network elements adjacent to the network element; and an identification module coupled to the routing module, the identification module for using the local protection channel information to identify an available protection channel on the local protection segment in the event of failure of a local working segment of the first working path, the local working segment adapted to connect the network element and the one of the adjacent interconnected network elements; wherein the available local protection channel on the local protection segment is used to switch local network bandwidth from the failed local working segment to the available local protection segment after the network failure has been detected.

BRIEF DESCRIPTION OF THE DRAWINGS

These and other features of the preferred embodiments of the invention will become more apparent in the following detailed description in which reference is made to the appended drawings wherein.

FIG. 3b shows further detail of the frame format of FIG. 3a;

FIG. 4b shows connection maps for the sub-network of FIG. 4a,

FIG. 4c shows routing maps of the protection signaling scheme for the sub-network of FIG. 4a;

FIG. 5 shows a failure mode for an alternative embodiment of the sub-network of FIG. 4a, FIG. 6 is an operational flowchart of the sub-network of FIG. 4a;

FIG. 7 is a further operational flowchart of the sub-network of FIG. 4a;

DESCRIPTION OF THE PREFERRED EMBODIMENTS

Figure 1:
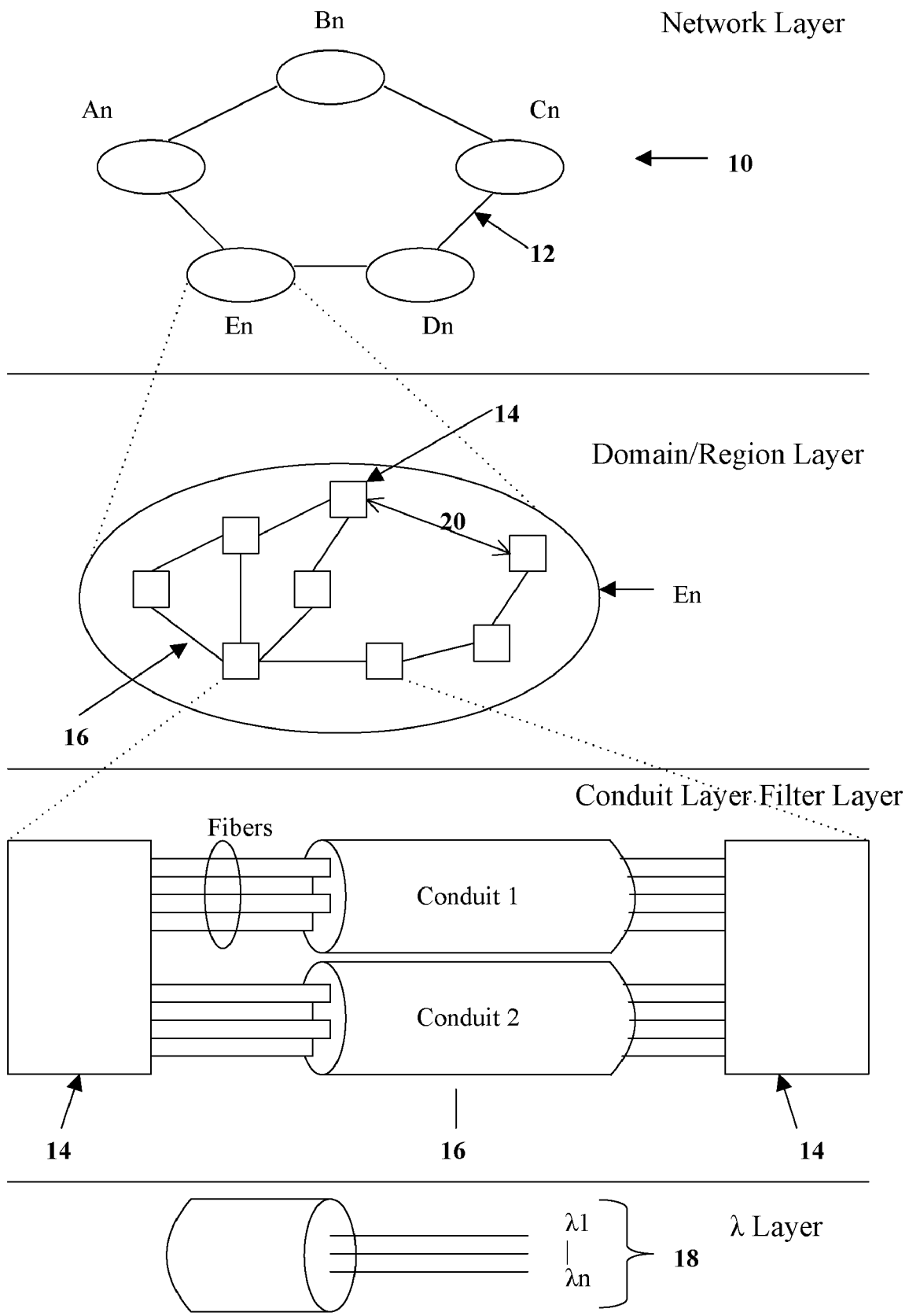
FIG. 1 is a diagram of a data communication network.

Referring to FIG. 1, a global telecommunication network 10 contains a series of sub-networks An, Bn, Cn, Dn, En interconnected by bulk data transmission mediums 12. These mediums 12 can consist of such as but not limited to optical fibre, wireless, and copper lines which are collectively referred to as the Backbone Network. Each sub-network An, Bn, Cn, Dn, En contains a plurality of network elements 14 interconnected by conduits 16, which can be collectively referred to as path layer 17 (see FIG. 2). These conduits 16 can consist of fibre optic cables, DSL (Digital Subscriber Loop), cable, and wireless mediums, wherein each conduit 16 can be capable of providing the transmission of multiple wavelengths 18 as required by the telecommunication network 10. The transmission structure of the telecommunication network 10 can be used by a variety of different carriers, such as ILECs, CLECs, ISPs, and other large enterprises to monitor and transmit a diverse mixture of data packets 20 in various formats. These formats can include voice, video, and data content transferred over the individual SONET, SDH, IP, WDN, ATM, and Ethernet networks associated with the telecommunication network 10.

Figure 2:
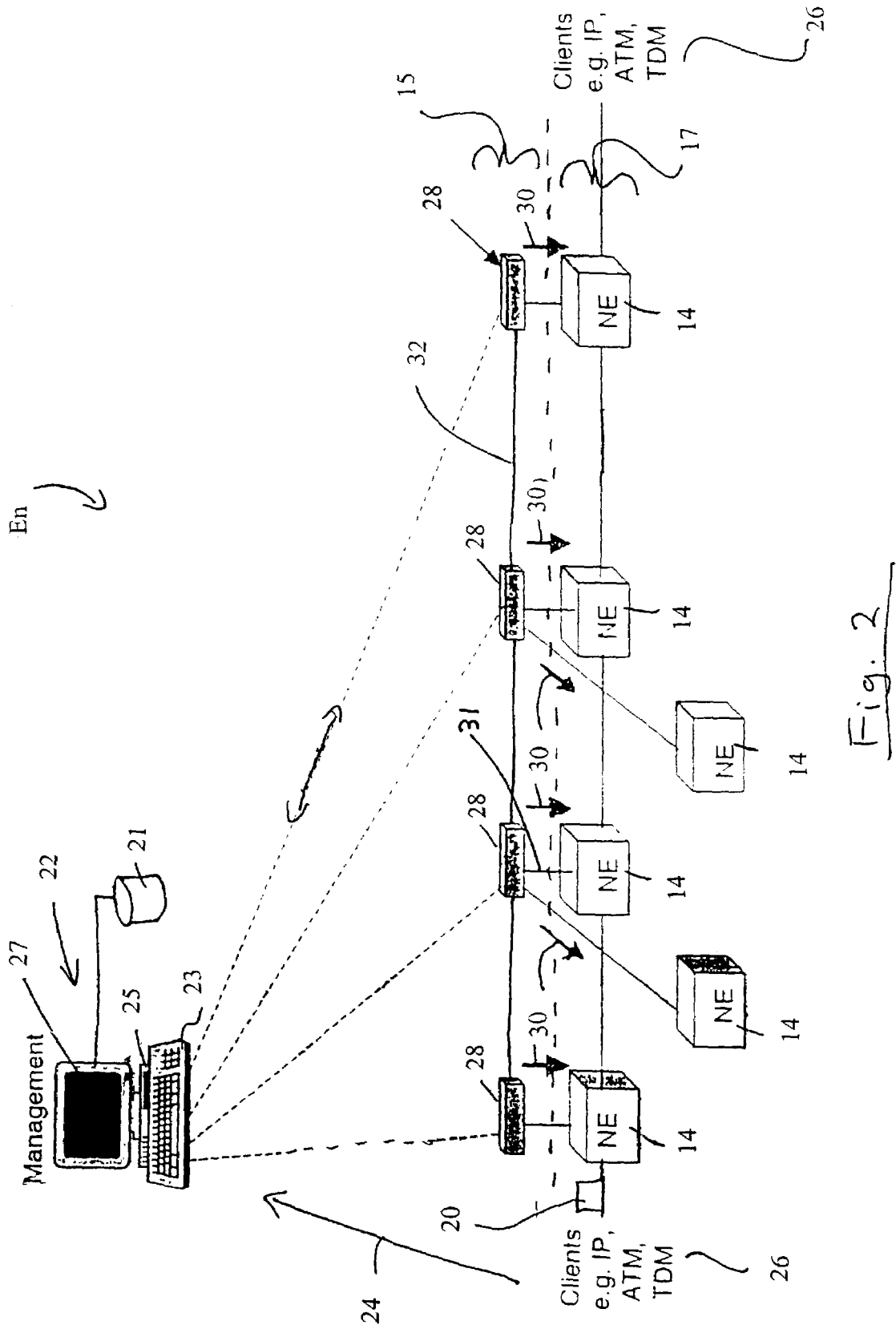
FIG. 2 is a sub-network of the network of FIG. 1.

Referring to FIG. 2, operation of each network element 14 can be monitored by a central integrated management or Operations Support System (OSS) 22, which for example co-ordinates a plurality of connection requirements 24 received from clients 26 connected to the sub-network E. Alternatively, these connection requirements 24 can also be communicated directly to a corresponding Optical Connection Controller (OCC) 28. The centrally integrated management or Operations Support System 22 can include a processor 25. The processor 25 is coupled to a display 27 and to user input devices 23, such as a keyboard, mouse, or other suitable devices. If the display 27 is touch sensitive, then the display 27 itself can be employed as the user input device 23. A computer readable storage medium 21 is coupled to the processor 25 for providing instructions to the processor 25 to instruct and/or configure the various OCCs 28, and corresponding coupled network elements 14, to perform steps or algorithms related to the operation of a shared protection class of service with protection signaling implemented on the path layer 17 of the sub-network En. The computer readable medium 21 can include hardware and/or software such as, by way of example only, magnetic disks, magnetic tape, optically readable medium such as CD ROM's, and semiconductor memory such as PCMCIA cards. In each case, the medium 21 may take the form of a portable item such as a small disk, floppy diskette, cassette, or it may take the form of a relatively large or immobile item such as hard disk drive, solid state memory card, or RAM provided in the support system OSS. It should be noted that the above listed example mediums 21 can be used either alone or in combination.

The clients 26 or other peripheral devices of the sub-network En can include such as but not limited to hubs, leased lines, IP, ATM, TDM, PBX, and Framed Relay PVC. Coupled to each network element 14 by link 31 is the OCC 28, which co-ordinates a connection and data request 30 to each of their corresponding network elements 14. This association of OCCs 28 is also referred to as a control layer 15 with each OCC 28 coupled together by links 32. The OCCs 28 have a complete picture of their corresponding element 14 interconnections.

Accordingly, the shared mesh protection class of service with protection signaling can be implemented on the sub-network En in regard to the co-ordination of the plurality of connection requirements 24 submitted by the clients 26, as well as monitoring the timely transmission of the data packets 20. The shared protection class of service can include both local and global protection schemes, as further described below.

The shared protection class of service provides a SONET protection signaling scheme for use in mesh networks. It is preferable that the protection signaling scheme be able to provide protection or restoration times of less than 200 msec for a large number of network connections consisting of coupled network elements 14 and OCCs 28, as further described by way of example only. The signal transmission and reception of data packets 20 and protection signaling 38 (see FIG. 5) over the sub-network En can be performed using the Synchronous Transport Signal (STS) frame format 200 (see FIG. 3a), which is a basic building block of a SONET optical interface. The following is a description of the SONET transmission format that can be used to implement the local and global protection signaling schemes on the path layer 17 of the sub-network En.

Figure 3A:
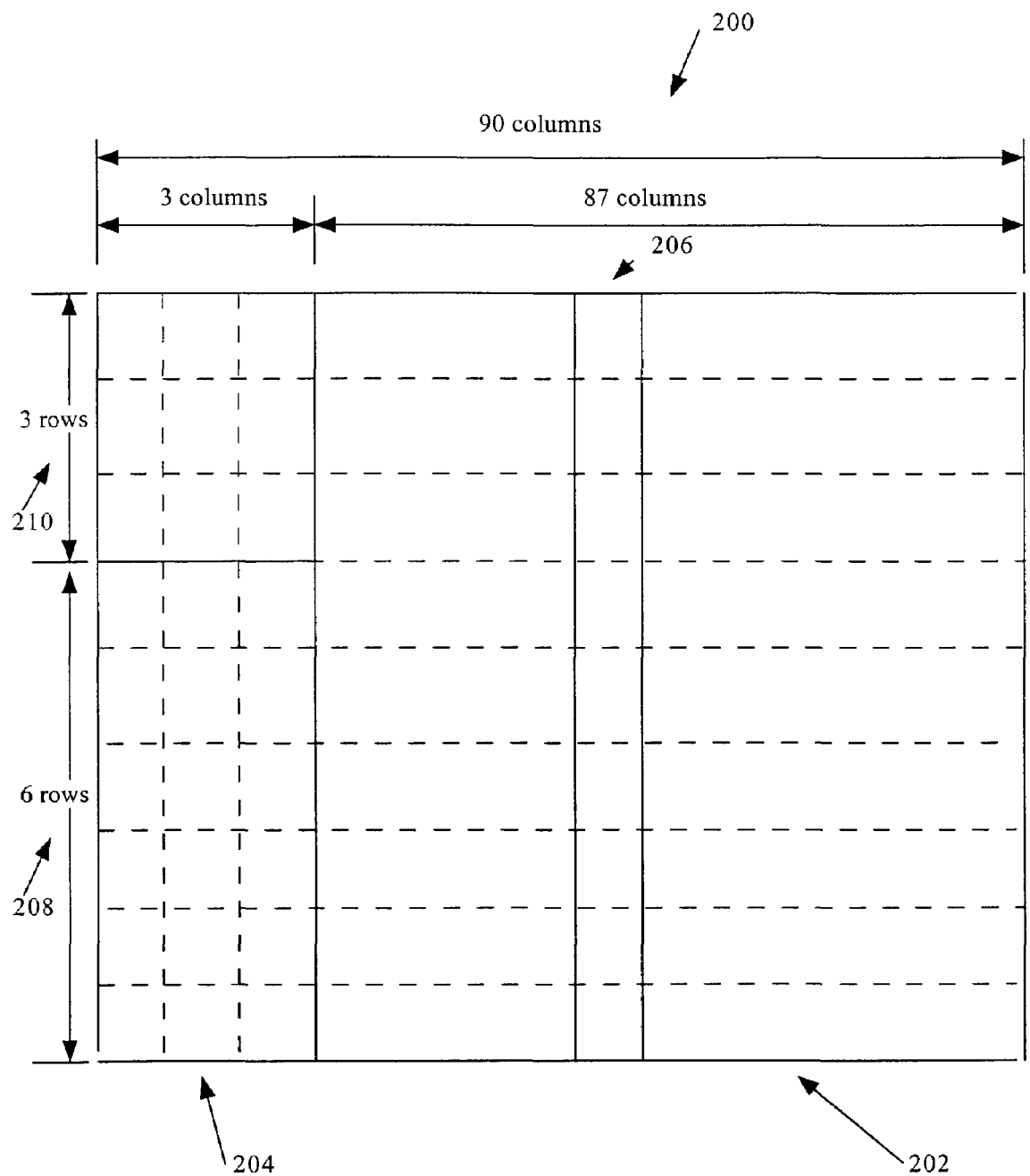
FIG. 3a shows an STS-1 frame format.
Figure 3B:
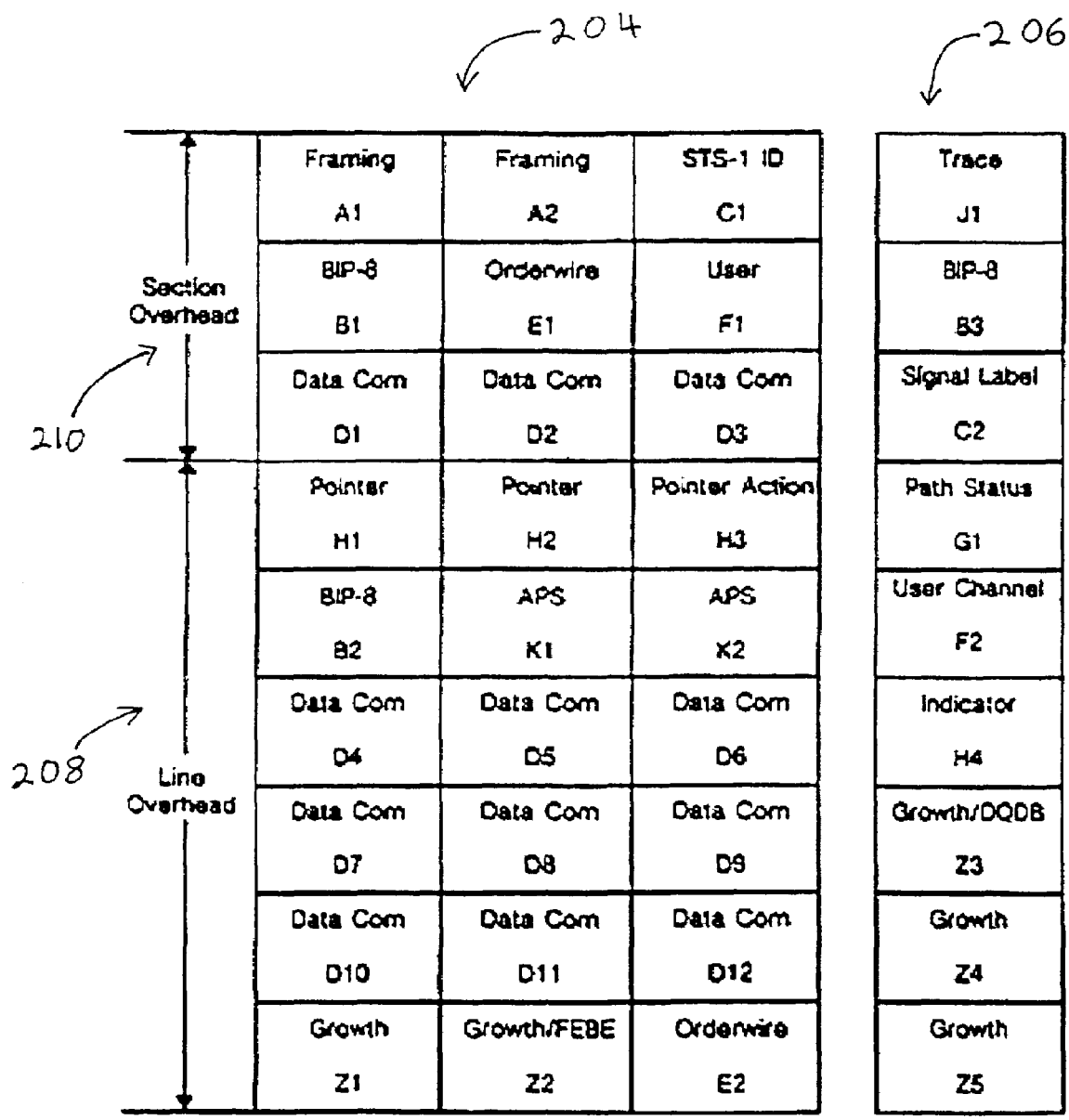

Referring to FIGS. 2, 3a, and 3b, the STS-1 (level 1) is the basic signal rate of SONET and multiple STS-1 frames 200 may be concatenated to form STS-N frames 200, where the individual STS-1 signals are byte interleaved. The STS-1 frame 200 comprises two parts, the STS payload 202 having 87 columns by 9 rows for a total of 783 bytes, and the STS transport header or overhead 204, having 3 columns by 9 rows for a total of 27 bytes. It should be noted the payload 202 can also contain a path overhead 206 having 1 column by 9 rows for a total of 9 bytes. The STS payload 202 carries the information portion of the STS-1 frame 200, while the STS transport overhead 204 carries the signaling and protocol information. This allows communication between network elements 14 within the sub-network En, facilitating administration, surveillance, provisioning, and control of the sub-network En from a central location. At the ends of the sub-network En, such as the clients 26, the data packets 20 with various rates and different formats are processed. A SONET end-to-end connection (see FIG. 4a for example connections A-B, C-D) includes line terminating equipment at both ends, both source and destination nodes, responsible for converting the data packets 20 from the user format to the STS format prior to transmission through the SONET sub-network En, and for converting the data packets 20 from STS format back to the user format once transmission is complete.

SONET networks typically contain a four layer system hierarchy, with each layer building on the services provided by the lower layers. Each layer communicates to peer equipment in the same layer, processes information and passes it up and down to the next layer. The path layer 17 (FIG. 2) helps to provide the end-to-end transport of data packets 20 converted to STS-1 payload 202 at the appropriate signaling speed, mapping services (such as DS1, DS2, DS3 and video), and path overhead 206 into Synchronous Payload Envelopes (SPEs) of the STS-1 frame 200. The control layer 15 helps to multiplex and synchronize the SPEs and can add line overhead 208 of the transport overhead 204 to form STS-N combined signal frames 200. The section layer (not shown) can perform scrambling and framing, and can add section overhead 210, in order to create the STS-1 frames 200. Finally, the photonic layer (not shown) is the SONET physical layer, converting electrical signals into optical STS-1 frames 200 and transmitting these to distant network elements 14. Further, at the distant network elements 14 the process is reversed, starting with the photonic layer, whereby the optical STS-1 frames 200 are converted to the electrical data packets 20 and passed down through the path layer 17 where the different service signals terminate. Further, the optical form of the STS-1 signals are called Optical Carriers (OCs), wherein the STS-1 signal and the OC-1 signal are designed to have the same rate.

It is recognized that higher rate STS frames 200 can be obtained by byte interleaving N aligned STS-1 frames 200 to form an STS-N frame 200 in accordance with conventional SONET technology. An STS-N frame 200 may be viewed as having a repetitive frame structure, wherein each frame 200 comprises the transport overhead bytes 204 of N STS-1 frames 200 and N synchronous payload envelopes 202. For example, three STS-1 signals may be multiplexed by a multiplexer into an STS-3 signal. The bit rate of the STS-3 signal is three times the bit rate of an STS-1 signal and the structure of each frame of the STS-3 signal comprises three synchronous payload envelopes 202 and three fields of overhead bytes 208 from the three original STS-1 signals When transmitted using optical fibres, the STS-N signal is converted to optical form and is designated as the OC-N signal. Furthermore, the protection P paths (see below) can also be OC3c up to OC192c as long as the infrastructure of the sub-network En supports concatenated payloads 202.

Referring to FIG. 3b, the transport overhead 204 and path overhead 206 for the STS-1 frame 200 of FIG. 3a are described in greater detail below, in particular the overhead bytes that can be used in transmission of the protection signals 38 (see FIG. 5) Selected bytes of these overheads 204, 206 are employed for failure identification and protection switching for the shared mesh protection scheme implemented on the sub-network En. As noted above, the overhead bytes contained in the overheads 204, 206 are distributed in 4 columns, each consisting of 9 rows.

The overhead bytes associated with the section overhead 210 of the transport overhead 204 include framing A1 and A2 bytes, which are dedicated to each STS-1 to indicate the beginning of the STS-1 frame 200. The A1, A2 bytes pattern is F628 hex (this F628 is never scrambled). When 4 consecutive errored framing patterns have been received, an OOF (Out Of Frame) condition is declared. When 2 consecutive error free framing patterns have been received, an in frame condition is declared. The section overhead 210 also contains a STS-ID C1 byte, which is a number assigned to each STS-1 signal in the STS-N frame in according to the order of its appearance, i.e. the C1 byte of the first STS-1 signal in the STS-N frame is set to 1, the second STS-1 signal is 2 and so on. The C1 byte is assigned prior to bye interleaving and stays with the STS-1 until deinterleaving. A section BIP-8 B1 byte is allocated from the first STS-1 of the STS-N for section error monitoring. The B1 byte is calculated over all bits of the previous STS-N frame 200 after scrambling using a bit interleaving parity 8 code with even parity. The B1 byte of the current STS-N frame 200 is calculated and compared with the B1 byte received from the first STS-1 of the next STS-N frame 200. If the B1 bytes match, there is no error. If the B1 bytes do not match and the threshold is reached, then an alarm indicator is set. An orderwire E1 byte is allocated from the first STS-1 of the STS-N frame 200 as local orderwire channel for voice channel communications. Accordingly, one byte of the STS-1 frame 200 is 8 bits/125 usec or 64 Kbps which is the same rate as a voice frequency signal. A user F1 byte is set for the user purposes, and is passed from one section level to another and terminated. A plurality of data communication D1, D2 and D3 bytes are allocated from the first STS-1 of the STS-N frame. This 192 kbps message channel of the D1, D2, D3 bytes can be used for alarms, maintenance, control, monitoring, administration and communication needs.

The overhead bytes of the line overhead 208 of the transport overhead 204 include Pointer H1 and H2 bytes, which in each of the STS-1 signals of the STS-N frame 200 is used to indicate an offset in the bytes between a pointer and the first byte of the STS-1 SPE The pointer is used to align the STS-1 SPE in an STS-N signal as well as to perform frequency justification. The first pointer H1 byte contains the actual pointer to the SPE, the following pointer H2 byte contains the linking indicator which is 10010011 11111111. The Pointer Action H3 byte in each of the STS-1 signals of the STS-N frame 200 is used for frequency justification purpose Depending on the pointer value, the H3 byte is used to adjust the fill input buffers. The H3 byte only carries valid information, but it is not defined for negative justification The BIP-8 B2 byte in each of the STS-1 signal of the STS-N frame 200 is used for line error monitoring function. Similar to the B1 byte in the section overhead 210, but the B2 byte uses bit interleaving parity 8 code with even parity The byte B2 contains the result from the calculation of all the bits of line overhead 208 and the STS-1 payload envelope 202 capacity of the previous STS-1 frame 200 before scrambling The Automatic Protection Switching (APS) K1 and K2 bytes are allocated for APS signaling between line level entities for line level bi-directional APS. These bytes K1, K2 are defined only for STS-1 number 1 of the STS-N signal frame 200. The Data Communication D4-D12 bytes are allocated for line data communication and should be considered as one 576-kbps message-based channel that can be used for alarms, maintenance, control, monitoring, administration, and communication needs between two section line terminating network elements 14. The D4-D12 bytes of the rest of the STS-N frame 200 are not typically defined. The Growth/FEBE Z1 and Z2 bytes are set aside for functions not yet defined. The Orderwire E2 byte is allocated for orderwire between line entities. This E2 byte is defined only for STS-1 number 1 of the STS-N signal frame 200

The overhead bytes of the path overhead 206 of the payload 202 envelope are assigned to and transported with the payload 202 The path overhead 206 is created by the PTE as part of the SPE until the payload envelope 202 is demultiplexed at the destination path network elements 14. The path overhead 206 supports the following four classes of operation: Class A payload independent functions required by all payload type, Class B mapping dependent functions not required by all payload type, Class C application specific functions, and Class D undefined functions reserved for future use. Accordingly, the Trace J1 byte, class A, is used by the receiving network element 14 to verify the path connection in the sub-network En. The BIP-8 B3 byte, class A, is assigned for path error monitoring. The path B3 byte is calculated over all bits of the previous STS SPE before scrambling using bit inter-leaved parity 8 code with even parity. The Signal Label C2 byte, class A, is assigned to indicate the construction of the STS SPE. The following hex values of the C2 byte has been defined as 0x00 —Unequipped signal, 0x01—Equipped signal, 0x02—Floating VT mode, 0x03—Locked VT mode, 0x04 —Asynchronous mapping for DS3, 0x12—Asynchronous mapping for 139.264 Mbps, 0x13 —Mapping for ATM, 0x14—Mapping for DQDB, and 0x15—Asynchronous mapping for FDDI. The Path Status G1 byte, class A, is assigned to carry back an originating STS PTE of the path terminating status and performance. This allows a complete duplex path to be monitored at either end. The User Channel F2 byte, class C, is allocated for user communications between network elements 14. The Indicator H4 byte, class C, provides a generalized multi-frame indicator for the payload 202. The Growth 3 bytes, Z3-Z5, are class D and are reserved for future functions.

As further noted below, some of the interrupt driven (i.e. considered fast access) overhead bytes, selected from the transport overhead 204 and/or the path overhead 206, are employed to implement the protection signaling scheme on the path layer 17 of the sub-network En It should be noted that shared protection signaling schemes for mesh network architecture, in general, can include one conduit 16 assigned between two corresponding network elements 14 assigned as a protection P link (see FIG. 4a) of a 1:N group, wherein the number "1" represents the group number and the letter "N" represents the particular member number of the corresponding group "1".

Accordingly, each of the working W paths (see FIG. 4a) become the members of the 1:N group, when the working W path is established during set-up of the logical conduit 16 between the network elements 14. For instance, the first working W path with a shared mesh class of service will become the first member of the first 1:N protection group on a particular channel or timeslot. Another working W path, which wants to share the corresponding shared protection P link, now becomes the second member of the 1:N protection group. Accordingly, in the protection P path system shown by example in FIG. 4a, the preferred protection information to be transmitted over the sub-network En is the number of the protection group "1" and the number of the working member "N" contained in the 1:N number pair. For example, in a 10G line, the maximum number of protection groups can be 192, thereby indicating 192 STS1 1:N protection groups. If the protection P link for example OC3c, OC12, or OC48, then the maximum number of the 1:N protection groups per channel would be less It should be noted that Bellcore specifies the maximum number of protection members to be 14.

The shared mesh protection signaling scheme of the present invention can employ, by way of example only, the overhead 208 APS bytes K1 and K2 for representing the group number "1" and member number "N". Traditionally, these K bytes are processed relatively quickly, since the network elements 14 are designed to process the K bytes as fast as possible for SONET protection purposes at the line level 17 independently of the control layer 15, i.e. interrupt driven. In the present protection signaling scheme shown in FIGS. 4a, b, c, it is desirable that the group "1" and member "N" information, transferred between the network elements 14 by way of the protection signals 38, does not exceed the capacity of the K1 and K2 byte content, wherein for a 10G line the maximum number of protection groups would be 192 and the Bellcore standard for the maximum number of protection members is 14. These values can be represented by the K1 and K2 bytes, where use of the K2 byte is restricted because of the AIS indication within the K2 byte. An example allocation for the protection signaling scheme using the K1/K2 bytes is given below, providing an indication of available bit values within the K1/K2 bytes.

| Ki bits 1-8 | K2 bits 1-5 (6-8 limited use only) | Assignment |
|---|---|---|
| 1111 1111 | 1111 1--- | Not Used |
| 1111 1111 through 1000 0000 | 1111 1101 through 0000 0100 | Reserved for future use (32,761 combinations) |
| 0111 xxxx | xxyy y--- | Switch Request; x indicates the protection group number (6 bits); y indicates the protection group member (3 bits) |
| 0110 xxxx | xxyy y--- | Acknowledgement of Switch Request; x indicates the protection group number (6 bits); y indicates the protection group member (3 bits) |
| 0101 xxxx | xxyy y--- | Negative Acknowledgement of Switch Request; x indicates the protection group number (6 bits); y indicates the protection group member (3 bits) |
| 0100 xxxx | xxyy y--- | Revert back to working request; x indicates the protection group number (6 bits); y indicates the protection group member (3 bits) |
| 0011 xxxx | xxyy y--- | Acknowledgement of Revert back to working request, x indicates the protection group number (6 bits); y indicates the protection group member (3 bits) |

-continued

| Ki bits 1-8 | K2 bits 1-5 (6-8 limited use only) | Assignment |
|---|---|---|
| 0010 0000 | 1111 1--- | Lockout of protection |
| 0010 0000 | 1111 0--- | Forced Switch |
| 0010 0000 | 1110 1--- | Reserved for SF - High Priority |
| 0010 0000 | 1110 0--- | Reserved for SF - Low Priority |
| 0010 0000 | 1101 1--- | Reserved for SD - High Priority |
| 0010 0000 | 1101 0--- | Reserved for SD - Low Priority |
| 0010 0000 | 1100 1--- | Manual Switch |
| 0010 0000 | 1100 0--- | Wait-to-Restore |
| 0010 0000 | 1011 1--- | Reserved for Exercise |
| 0010 0000 through 0000 0000 | 1011 0--- through 0000 1--- | Reserved for future use (1045 combinations) |
| ---- ---- | ---- -111 | AIS-L |
| ---- ---- | ---- -110 | RDI-L |
| 0000 0000 | 0000 0--- | No Request (Idle) |

Accordingly, for the above example K byte values, one 10G fibre contains 192 STS1s. Therefore, the absolute maximum value in this example for the group number now referred to as "x" can never be greater than 192, i.e. there can not be more than 192 1:N protection groups on one fibre This assumes that the 1:N groups are all of an STS1 size. If larger sizes are used, for instance OC3 and larger, the number of possible 1:N groups for fibre is reduced For example, only four OC48 1:N groups are possible on one 10G fibre. The value of the member number N in Bellcore 1:N standards is a maximum of 14, which hereafter is represented by "y" Hence the largest value for the (x,y) group, member pair can be "192, 14" requiring 8 bits for "192" representation with "14" requiring 4 bits for representation. The largest value that can be supported by the K1 and K2 bytes is: 8 bits of the K1 byte and 5 bits of the K2 byte. Bits 6 to 8 of the K2 byte are used for AIS-L and RDI-L signaling, therefore totaling 13 available bits. One available bit can also be used to indicate whether the K1/K2 bytes are sending a protection switch request verses a link failure indication through the protection signals 38 (see FIG. 5) The K byte message (x, y) can also use 1 bit indicating "link failure" and the remaining 12 bits can be used to indicate the link identity. Indication of the failure can be inserted into the K1/K2 Bytes, such as but not limited to using the AIS-L. Furthermore, a couple of bits can be used for special messages (ACK, NACK, etc.). Therefore, reserving 3 bits (4 messages) for this purpose leaves 10 bits for protection path identification, which if 64 1:N protection group (6 bits) with 7 member (3 bits) each per fibre or combinations thereof. It should be noted that 2 bits can be kept in reserve which are available from the extended K byte. It is therefore recognized for suitable sized protection group and member pairs (x,y) that the K2 byte could represent the group number "y" and the K1 byte the member "y"

Figure 4A:
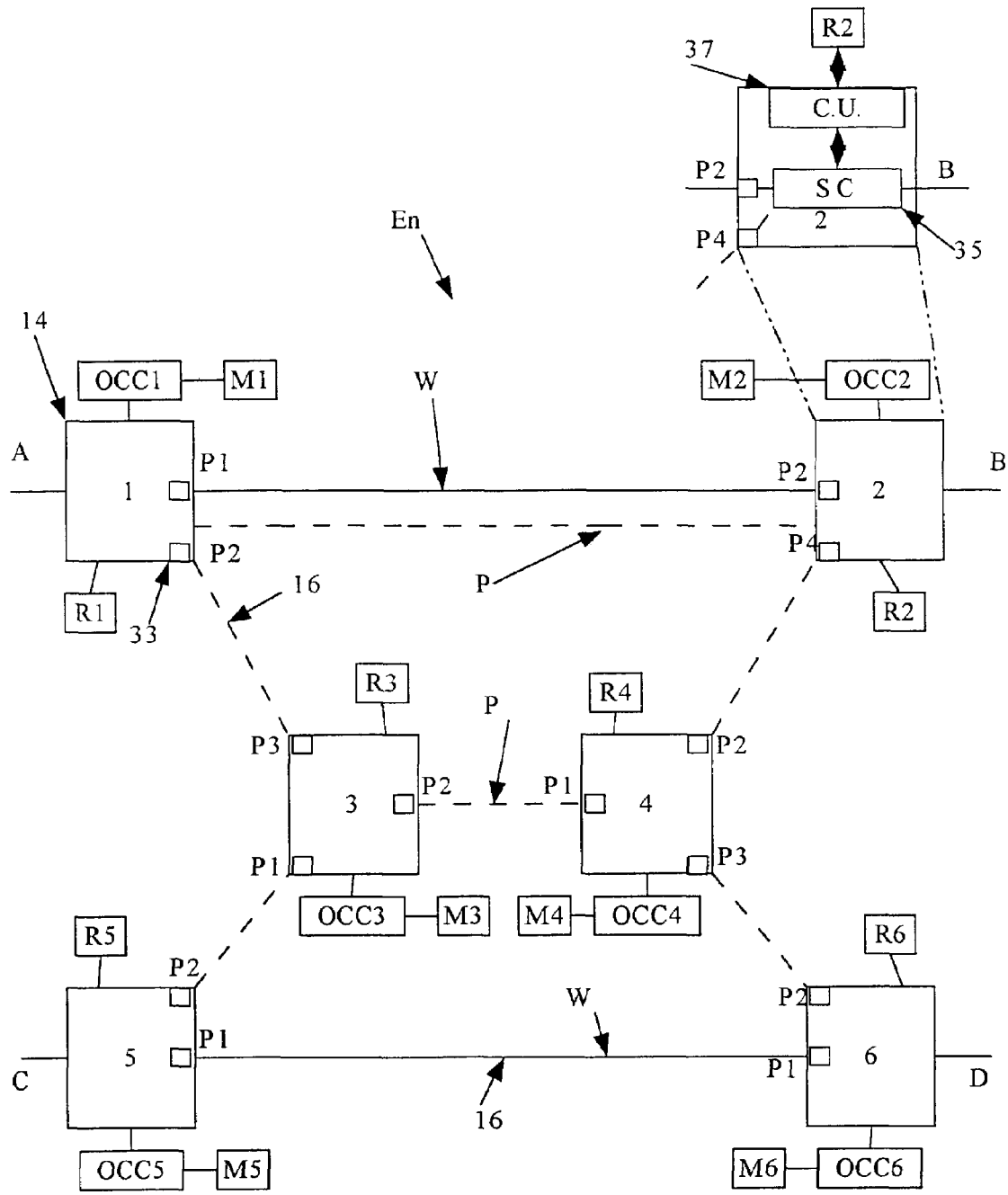
FIG. 4a is a protection signaling scheme on the sub-network of FIG. 2.

Referring to FIG. 4a, the simplified shared mesh network sub-structure En is presented for clarity purposes only to help demonstrate the global protection scheme of the shared protection class of service. The shared path protection set-up of the sub-network En consists of a series of network elements 14 indicated as 1, 2, 3, 4, 5, 6 with a corresponding number of OCC's 28 indicated as OCC 1, OCC 2, OCC 3, OCC 4, OCC 5, and OCC 6. The network elements 14 are interconnected by the conduits 16, logical and/or physical, with solid line connections A-B and C-D denoting the working W paths and the dotted line paths 1-3-4-2 and 5-3-4-6 between the network elements 14 denoting the potential protection P paths. The term "working" refers to the routes and equipment involved in carrying the STS-1 frames 200 on the sub-network En during the normal mode of operation, and the term "protection" refers to the routes and equipment involved in carrying the STS-1 frames 200 on the sub-network En during a failure mode of operation. It is recognized that each protection P path is made up of a series of individual protection links between adjacent network elements 14. For instance, protection P path for the working W connection or path AB includes protection links 1-3, 3-4, and 4-2. It is further recognized that the protection link 3-4 is shared between working connections AB and CD. It is further recognized that each of the working W paths can involve one or more working links. For instance, working connection AB has the working W path containing working link 1-2, while the working connection AB for FIG. 5 contains three working links 1-7, 7-8, and 8-2.

The "normal mode of operation" refers to the operation of the sub-network En when all conduits 16 between the network elements 14 are uninterrupted and the elements 14 operate without faults. The term "failure mode of operation" refers to the operation of the sub-network En when some of the conduits 16 between some network elements 14 are interrupted due to, such as but not limited to a cable cuts or element failures It is recognized that the working W and protection P paths can contain a number of defined working and protection channels or timeslots respectively, which are dependent upon the OC-N format and subsequent setup of the sub-network En when the connections A-B, C-D are defined.

Figure 4B:
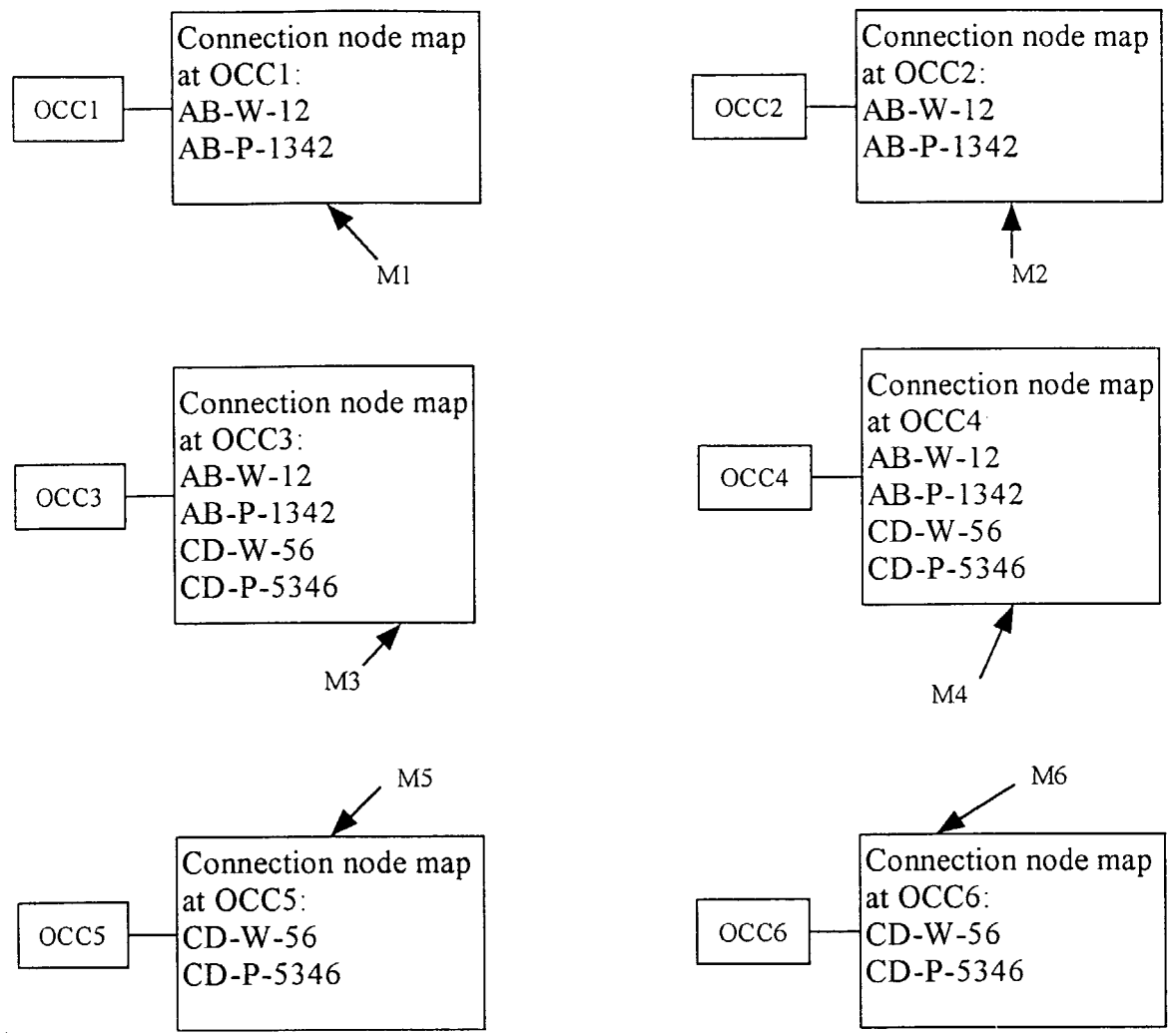

Referring to FIGS. 4a and 4b, each controller OCCn of the sub-network En has stored a corresponding connection map Mn of all network elements 14 used in the working W and protection P paths containing the associated conduits 16. These connection maps Mn are indicated as M1, M2, M3, M4, M5, M6, which contain connection information for all network elements 14. Referring to FIG. 4b, various example connection maps Mn are presented that correspond to the network structure of sub-network En of FIG. 4a. For example, map M1 is stored at controller OCC1 and contains a working connection A-B between elements 1 and 2 (AB-W-12), and a protection P path for the working connection A-B identified as containing network elements 1,3,4,2 (AB-P-1342). Accordingly, the other connection maps Mn for the remaining maps M2, M3, M4, M5, M6 follow a similar nomenclature for each map Mn entry. It should be noted the working connections A-B and C-D are protected via the protection P paths represented by the dotted lines Therefore, between network elements 3 and 4 a protection segment 3-4 is shared by the working connections A-B and C-D. When the protection P path of the working connection A-B is set-up, the connection information contained in map M1 is stored at the controllers OCC3 and OCC4 in maps M3 and M4, since their corresponding network elements 3, 4 are contained within the protection P path for the working W path interconnection between network elements 1, 2. Similarly, the protection information of maps M5 and M6 are also present in the maps M3 and M4 Accordingly, the connection maps Mn give the OCCs 28 the complete network connection architecture of the path layer 17 for the defined connections A-B, C-D During the set-up of the protection P paths for the working connections A-B and C-D, nodal diversity is accounted for to reduce the risk of unprotected working W paths in the event of network failures. Accordingly, at the controllers OCC3 and OCC4, the connection maps M1 and M2 for the working connection A-B will be compared by a comparison function with the connection maps M5 and M6 corresponding to the working connection C-D. This comparison function helps to provide node diversity of the shared mesh protection signaling scheme. If the comparison function determines that there is no overlap of the working W or protection P paths contained in the connection maps M1, M2, M5, M6, then the working connections A-B and C-D are assigned the shared protection P path situated between network elements 3 and 4 On the contrary, if comparison function of the connection maps M1, M2, M5, M6 indicates that the interconnections between the corresponding network elements 14 are not diverse, then the protection P path is either assigned to another 1:N group of a corresponding port 33 of the network elements 14, or the connection is not acknowledged (NACK) to the respective source network elements 1, 3, 6 (see following discussion on FIG. 4*c*) for another try via a different route mapping. The process of setting up node diversity is to help prevent the situation in which two or more working W paths, sharing a common protection P path, are susceptible to interruption by the same failure. However, it is noted that the simultaneous failure of multiple working W paths could produce the undesirable result of only one of the interrupted working W paths being able to use the commonly assigned protection P path.

Figure 8:
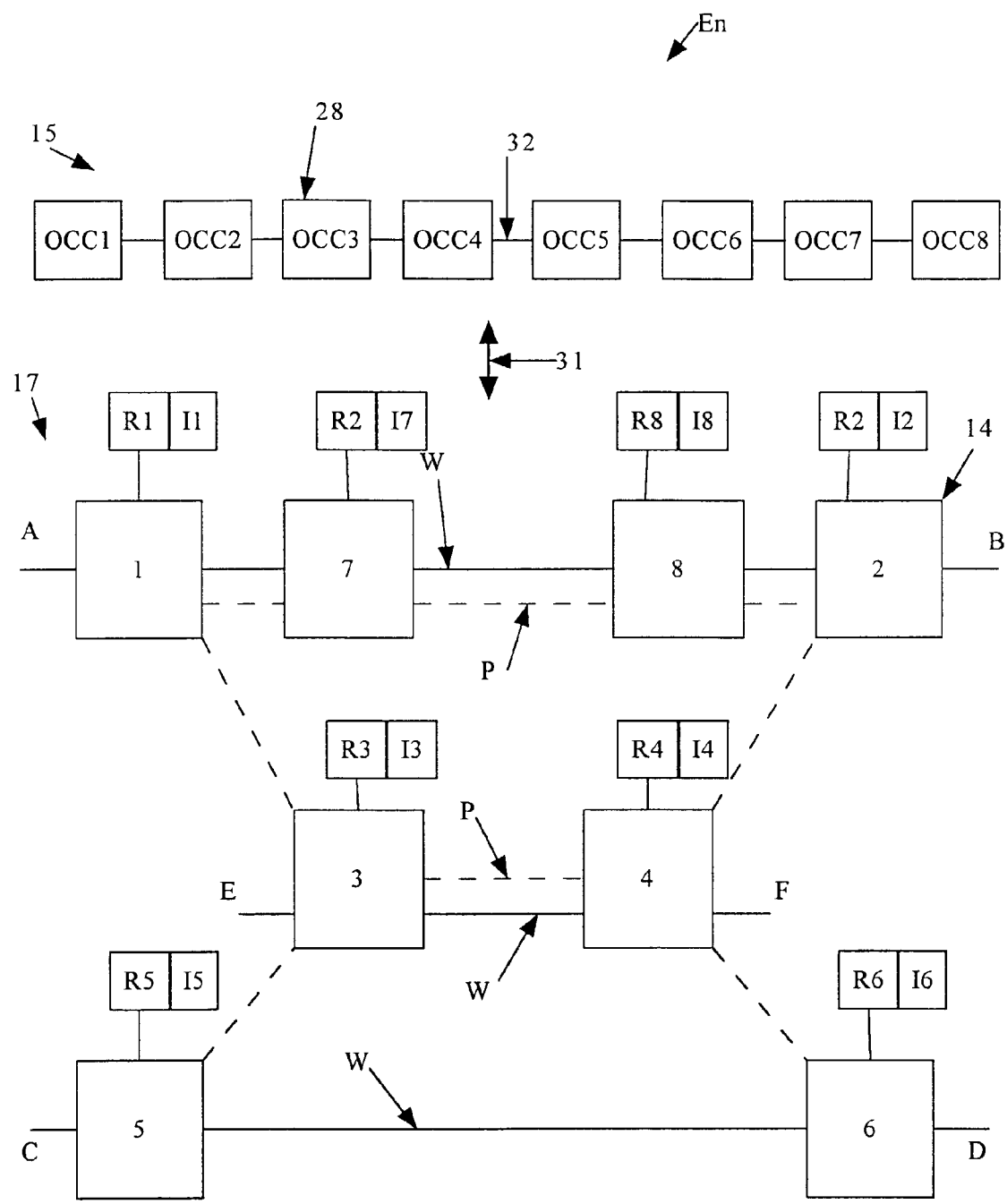
FIG. 8 is a further embodiment of the sub-network of FIG. 5.

Accordingly, in the above described sub-network En, the selection and subsequent assignment of 1:N protection P paths is now reduced to comparing a list of network elements 14 by the OCCn in the context of a unique identification for each of the specified protection P paths It is recognized that alternative arrangements of the example sub-network En shown in FIG. 4*a* can be used to implement the above described shared protection P path setup, such as an additional working W path between network elements 3 and 4 (see FIG. 8).

Referring again to FIG. 4*a*, the hardware of the network elements 14 have the ports generically identified as 33, which are specifically labeled respectively as P1, P2, P3, and P4 for each of the network elements 14 for use in routing identification. The network elements 14 also contain, as it is known in the art, switch cards 35 and control units 37, such that the switch card 35 of each network element 14 is connected to the corresponding plurality of ports 33, and the network elements 14 are configured by the switch cards 35 to couple the ports 33 such that STS-1 frames 200 received on one of the ports 33 is output for another of the ports 33. The control units 37 of the network elements 14 are connected to the corresponding switch cards 35, and monitor the adjacent network conduits 16 for a failure 34 (see FIG. 5) affecting the working W path.

Figure 4C:
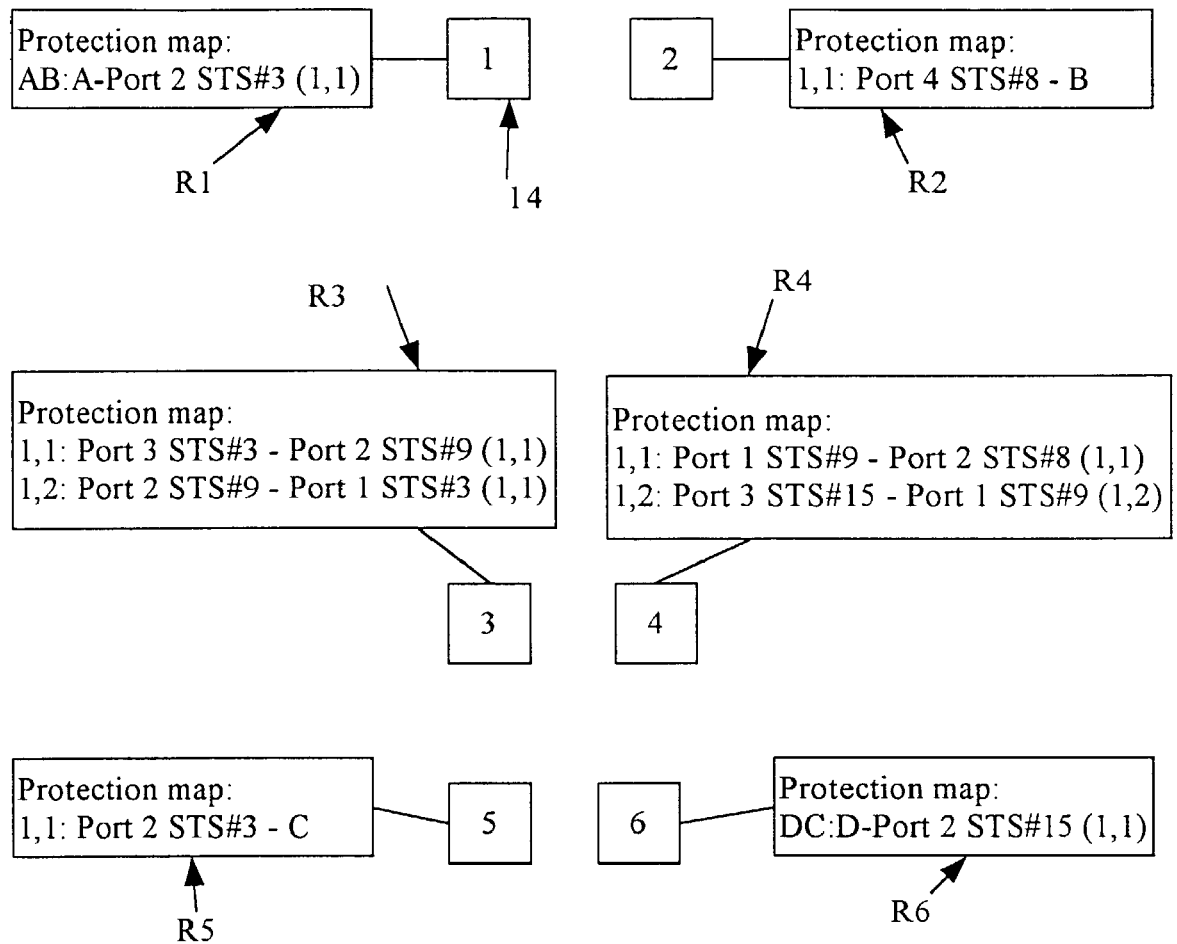

The network elements 14 also have corresponding routing tables R1, R2, R3, R4, R5, R6 (Rn) stored at their respective switch cards 35 with preloaded data that provides for optimized protection signaling, including a protection P path routing indicator of K byte values (x, y), for example, for insertion into the STS-1 overheads 204, 206. These routing tables R1, R2, R3, R4, R5, R6 are defined at the connection set-up time from data supplied by the OCCs 28 when the working W paths and corresponding protection P paths are established. It should be noted that the protection P paths are only implemented in the sub-network En by the network elements 14 after the working W path fails. Referring to FIG. 4*c*, the contents of the routing or protection tables R1, R2, R3, R4, R5, R6 are shown in respect to their corresponding network elements 1, 2, 3, 4, 5, 6. Accordingly, each of the network elements 14 have their respective local network structure of the overall shared protection P path scheme stored in their respective tables Rn associated with their switch cards 35

As shown by example in FIGS. 4*a* and 4*c*, at node A the protection map R1 has an entry which reads A-B: A-port 2 STS#3 (1,1), which means that when the failure 34 (see FIG. 5) occurs on the connection A-B, the add/drop port of A is connected to STS#3 of port P2 and the K-byte value 1,1 representing the group, member pair is sent to network element 3 Upon inspection of protection table R3, the first entry indicates that when the K-byte value 1,1 is received on port P3, then STS#3 on port P3 is connected to STS#9 on port P2 and K-byte value 1,1 is sent on port P2 towards network element 4. A second entry of the table R3 indicates when the K-byte value of 1,2 has been received at port P2, STS#9 on that port P2 must be connected to STS#3 on port P1 and the value 1,1 must be sent on port P1 towards node C Accordingly, the entries in the other tables R2, R4, R5, and R6 can be interpreted similarly. It should be noted in the sub-network En of FIGS. 4*a* and 4*c* that the protection channel STS1#9 is shared on the conduit 16 between network elements 3 and 4 (i.e. protection segment 3-4) to protect both working connections A-B and C-D. Accordingly, from the routing tables R1, R2, R3, R4, R5, R6 one can deduce that working connection A-B is source routed from network element 1, while working connection C-D is source routed from network element 6. Further, the protection P paths indicated by the dotted lines are built up starting at the source network elements 1, 3, 6 and the corresponding routing tables R1, R2, R3, R4, R5, R6 are set-up when the working connections A-B, C-D are initialized by the OCCs 28 of the control layer 15 (see FIG. 2).

Accordingly, when a network failure 34 (see FIG. 5) is detected on the working P path between network elements 1 and 2, the destination network element 2 could send an appropriate failure indication signal 38 (see FIG. 5) to the corresponding source network element 1 along the available protection P paths 2-4-3-1 or 2-1. Similarly, upon detection of a network failure on the working P path between network elements 5 and 6, the destination network element 5 could send the appropriate signal 38 to the corresponding source network element 6 along the protection P path 5-3-4-6. It is noted that in a mesh network, the failure 34 of the working W path is typically detected at the adjacent network element 14 where the affected working channels of the failed working segment of the working W path are terminated. The required protection switching in the sub-network En is done by the network elements 14 in the path layer 17 (see FIG. 2), and protection switching is therefore initiated from the various source network elements 1,6. Further details of the global protection scheme are given below with reference to the example sub-network En given in FIG. 5.

Figure 5:
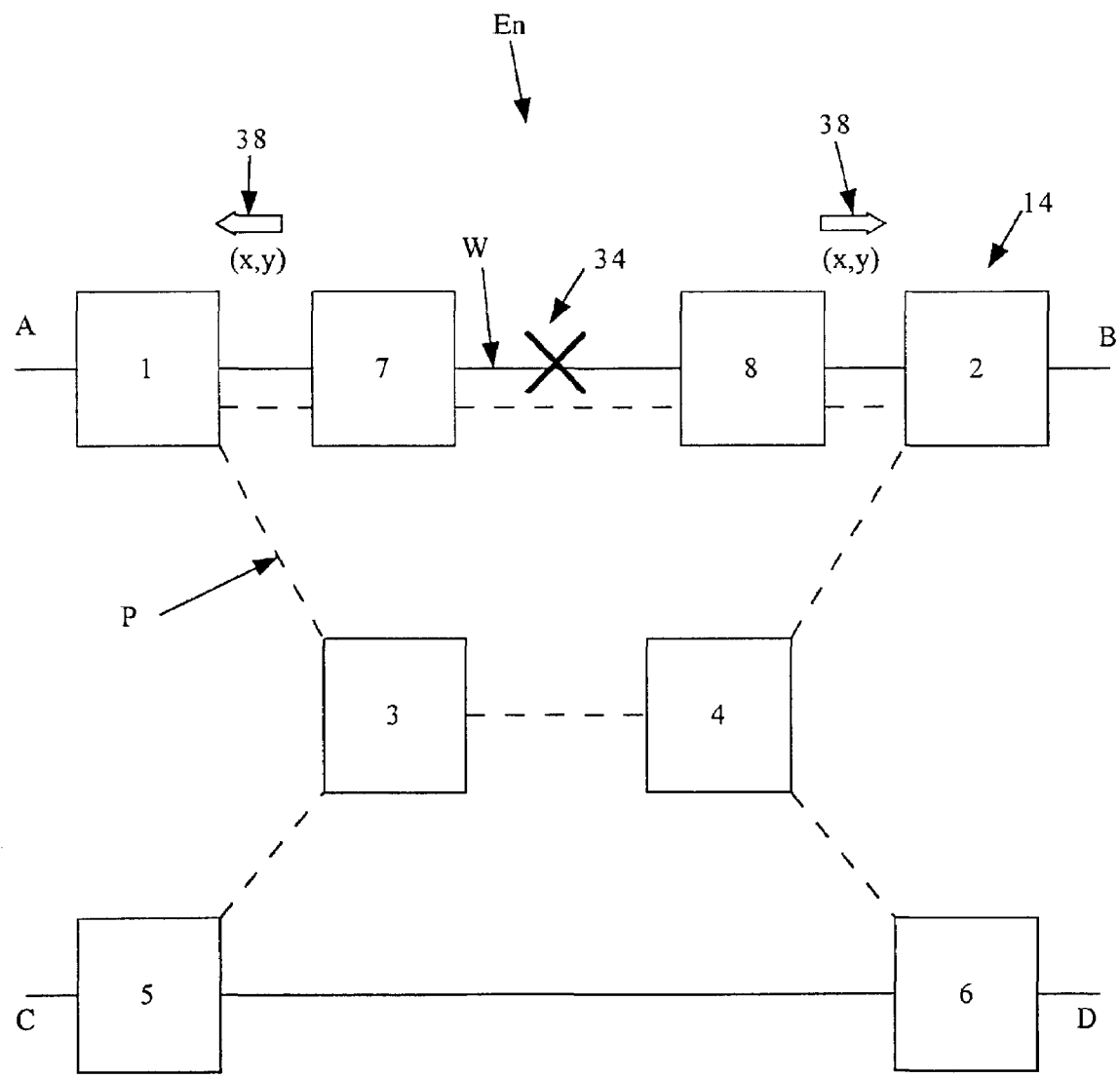

Referring to FIG. 5, an alternative embodiment of sub-network En is shown with interconnected network elements 1, 2, 3, 4, 5, 6, 7, and 8 The line failure 34 has occurred between the intermediate network elements 7 and 8, which is subsequently detected by network elements 7 and 8 for cases of bi-directional communication of the data packets 20 over the sub-network En (i.e. both network elements 7 and 8 can be considered as receiving network elements 14, depending upon the transmission direction for the defined working and protection channels present in the working W and protection P paths) It is noted that network elements 14 operating in a transmission capacity may not detect that the failure 34 has occurred in the working W path, for failed working channels that serve only as transmission conduits 16 for the respective network element 14 Notwithstanding, the network elements 7,8 detecting the failure 34 transmit the signal 38 over the path layer 17 (see FIG. 2) to the appropriate source/destination network elements 1,2. Accordingly, application of the global protection scheme provides for no protection switching done at the intermediate network elements 7, 8. Instead, the network elements 7,8 propagate the signal 38 directly over the path layer 17 to the source and destination network elements 1,2, which coordinate the set-up of the protection switching over the assigned shared protection P path 1-3-4-2 (as given in the connection maps Mn). Preferably, the transmission of the signal 38 is not directed over the control layer 15 for subsequent use by the OCCs 28 (see FIG. 2) to become involved in the set-up of the protection P paths. Instead, the failure detection, notification (signals 38), and resultant protection P path set-up (according to tables Rn) are accomplished by the network elements 14 (over the path layer 17) independently of the OCCs 28.

Referring again to FIG. 5, the control units 37 (see FIG. 4*a*) of the network elements 7, 8 monitor for the failure 34 within the working connection A-B. Accordingly, once the failure 34 is detected by the SONET layer, the corresponding control units 37 of the affected network elements 7, 8 further operate to determine protective switching data corresponding to the failure 34 and to insert the protection switching contained in data of the routing tables Rn within the overhead 204, 206 of the STS-1 frame 200 of the signal 38, such as but not limited to using AIS-L for insertion. This data from the routing tables Rn is then transmitted in the protection signal 38 from the corresponding ports 33 (see FIG. 4*a*) of the affected network elements 7, 8. Accordingly, to facilitate the indication of the line failure 34 to the source network element 1, the associated conduits 16 (either working W and/or protection P paths) leading back to the source element 1 are flooded using the K byte value (x, y) of the signal 38 The source network element 1, protecting the working connection A-B, will use the K bytes value (x, y) retrieved from in the STS-1 overhead 204, 206 of the signal 38 to identify the line failure 34 along the defined protection P path towards the destination network element 2 (providing the identity of the working connection A-B that failed), thereby causing the assigned protection P path 1-3-4-2 to be set-up through reconfiguration of the switch cards 35 of the corresponding network elements 1, 3, 4, 2.

Accordingly, a protection switch is triggered at the source network element 1 and the appropriate switch selection is done at the destination network element 2 to resume continuity of potential transmissions of data packets 20 originally destined for the failed working W path 1-7-8-2. It should be noted in the above example that for the affected network element 7, the K-byte value (x, y) from the corresponding routing table R7 is inserted into the overhead 204, 206 K1/K2 bytes of the signal 38, which is eventually received by the source network element 1 and thereby reports the identified failure 34. In this case, the failure indication in the signal 38 is transmitted back to the source network element 1 in the conduits 16 (see FIG. 4*a*) that are included in the failed working W path of the connection A-B.

It should be noted a consequence of assigning the protection P path 1-3-4-2 by the global protection scheme (to replace the failed working W path 1-7-8-2) is that all available protection channels present in the protection P path 1-3-4-2 are no longer available to protect any subsequent potential failures occurring on the working connection C-D. This is a result of the shared protection segment 3-4 of the protection P path being assigned to both the connections A-B and C-D. However, the process of nodal diversity helps to reduce the occurrence of simultaneous failures occurring on both the working connections A-B and C-D. The implementation of the global protection signaling scheme in the mesh sub-network En can provide advantages similar to ring or path switching in ring networks.

Accordingly, using the above-described global routed mesh protection scheme, suitable information can be exchanged in the K1 and K2 bytes to uniquely identify the set-up of the protection P paths for corresponding working W paths in a one to many sub-network En configuration. It is recognized that other suitable overhead bytes of the overhead 204, 206 could be used in place of the K1/K2 bytes, given above by way of example only. It should be noted that the elapsed time, from failure detection by the SONET layer to the eventual configuration of the switch cards 35 in the selected protection P path, is preferably less than 200 msec based on the noted example sub-network En of 200 network elements 14.

In the present shared mesh protection signaling scheme controlled by the source network elements 1,3,6, the exchange of K-byte values (x, y) by two network elements 7, 8 (see FIG. 5) may have no absolute confirmation guarantee that the respective K-byte (x, y) has been read by the adjacent corresponding network elements 1, 2 before the next value (x, y) is sent. Therefore, it is assumed that the transmitted K-byte values (x, y) will be read in time for adequate protection switch processing. Therefore, for those K-byte values (x, y) that are not read in time, a re-send operation can be done in the event that the corresponding network element 14 does not receive an ACK or NACK. However, it is recognized that the re-send operation may be performed with an inherent delay hence there may be no guarantee that the result of the re-send will still be within the desirable switching protection limit of less than 200 msec. In operation of the described K-byte value (x, y) exchange, as further described below, the corresponding network elements 7, 8 sending the K-bytes (x, y) will send the same value (x, y) for a pre-determined number of msec. It can then take the corresponding network element 14 up to 0.375 msec, 3 frames for example, to validate the K-byte values (x, y) and generate an interrupt signal. The interrupt signal will cause the network element 14 to read the K-byte value (x, y) and put it on a cue for processing. The pre-defined validation time period will be set such that under heavy load conditions at the receiving network elements 1, 2 the number of lost K-byte values (x, y) is less than 99.999%, or any other suitably acceptable tolerance for a particular architecture of the sub-network En.

In the event that a K-byte value (x, y) does not get read in time and is overwritten in the STS-1 overhead 204, 206, care should be taken to provide that the overwritten K-byte value (x, y) is re-transmitted. However, when certain K-byte values (x, y) are lost then either the protection switch request message or the ACK/NACK could also be lost. Therefore, a possible result of either of these two cases is that the source network elements 1,6 will not receive the ACK or the NACK. Accordingly, after sending the K-byte message request (x, y), the routing source network elements 1, 6 can start a timer, whereby after the timer expires corresponding protection request can be put aside until all other protection switches of the corresponding protection P path(s) have been completed. At this time, the corresponding network elements 1, 6 can re-try the previously failed protection switch. Further implementation is that after for example three failed attempts the source network elements 1, 6 can give up the message requests and raise an alarm condition indicating the failure of the intended message request. It is recognized that a consequence of the failed protection switch request can be that a part of the protection P path(s) has been set-up from the termination network element 2 towards the routing source network element 1. Accordingly, since the complete protection P path is reserved for the protection switch, no misconnection can result. Therefore, if the network elements 14 can not set-up the desired protection P path, the source network element 1 will keep trying to release the protection P path to ensure there is no unclaimed protection P path connection(s) in existence.

Figure 6:
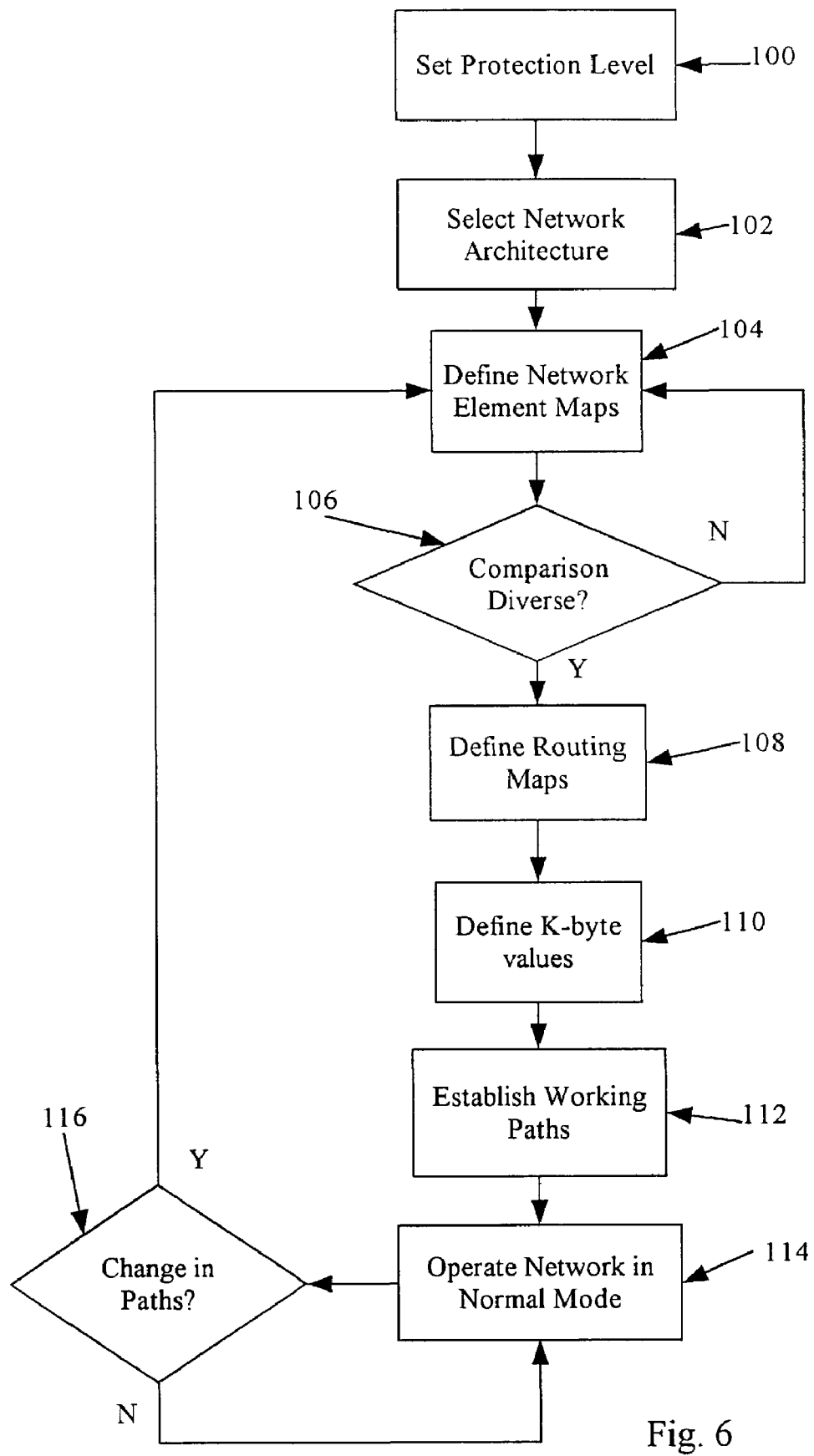

Referring to FIG. 6, the operation of the global shared protection signaling scheme can be performed automatically through the use of software and/or associated hardware as will be described herein below. At step 100, the required level of protection for each conduit 16 is determined by the management system 22, in response to connection requirements 24 received and/or anticipated from the clients 26. Next, the network 10 and sub-networks An, Bn Cn, Dn, En architecture, as depicted by example in FIGS. 1 and 2, are selected 102 from available network resources for network elements 14 and conduits 16, to be used for both the protection P and working W paths to satisfy the customer requirements 24 It is recognized that preferably the shortest paths are chosen as the working W paths and the next most optimal paths are chosen as the corresponding protection P paths in a 1:N relationship, subject to other considerations such as load capacity, nodal diversity, and cost.

At step 104, each controller OCCn 28 of the sub-network En stores a corresponding map Mn of all network elements 1, 2, 3, 4, 5, 6 used in the path of each conduit 16. These connection maps Mn identify the particular working W paths and the network elements 14 they contain, as well as the related protection P paths and their contained network elements 14. In diverse environments, the connection maps Mn corresponding to adjacent working W paths are compared 106 so as to check whether there is no overlap of working W or protection P paths contained in the maps Mn. The degree of acceptable overlap will be according to a predefined tolerance. Accordingly, in the event no overlap is confirmed, the specified working W paths can share the defined protection P path selected (i.e. 1:N protection scheme). On the contrary, if the interconnections between the network elements 14 6 are not diverse, then the protection P paths can be redefined until diversity is achieved.

Next, the routing table Rn information is defined 108 and stored at the network elements 14 with the routing table Rn data (see FIG. 4c) that will be used in the event of protection path P initialization. The protection switching data of the table Rn includes the switching data that is inserted within the K1/K2 protection bytes of the overhead 204, 206 of the STS-1 frames 200 once a particular failure mode 34 occurs. These K-byte values (x, y) are transmitted in the opposite direction of where the failure 34 occurred by the network elements 14 detecting the failure 14, for eventual reception by the source network elements. 14 The routing table Rn data defines conduit 16 modifications that are required to be performed within the switch cards 35 of the network elements 14 included within the protection P paths, to implement the re-routing of failure affected transmission of the data packets 20 represented by the STS-1 frames 200. The K byte values (x, y) are defined 110 in the routing tables Rn for use in the event the failure mode 34 is detected. Accordingly, the K1 byte is used to define the group number "x" and the K2 byte is used to define the protection group member "y". The function of the K byte value (x, y) is to direct the corresponding network elements 14 making up the protection P paths to cross connect the required ports 33 and time slot information (see FIG. 4c), thus resulting in protection P path generation once the failure 34 has been detected.

Next, the switch cards 35 of the network elements 14 concerned with the various defined working W paths are configured 112 to dictate where particular customer STS-1 frames 200 will be routed during normal operation of the sub-network En. The combined effect of the switch card 35 configurations is the defining of the optical carrier conduits 16 and the network elements 14 that are to be used if STS-1 frame 200 is received during the working or normal mode of operation of the sub-network En, on a particular port 33 within a path termination sub-network element En. After definition and set-up of the working W paths, the network 10 operates in normal mode 114 until the failure 34 is detected, as detailed below. However, in the event the working W or protection P paths are modified prior to failure mode 34 in the sub-network En, then the maps Mn and tables Rn are updated 116 as required.

Figure 7:
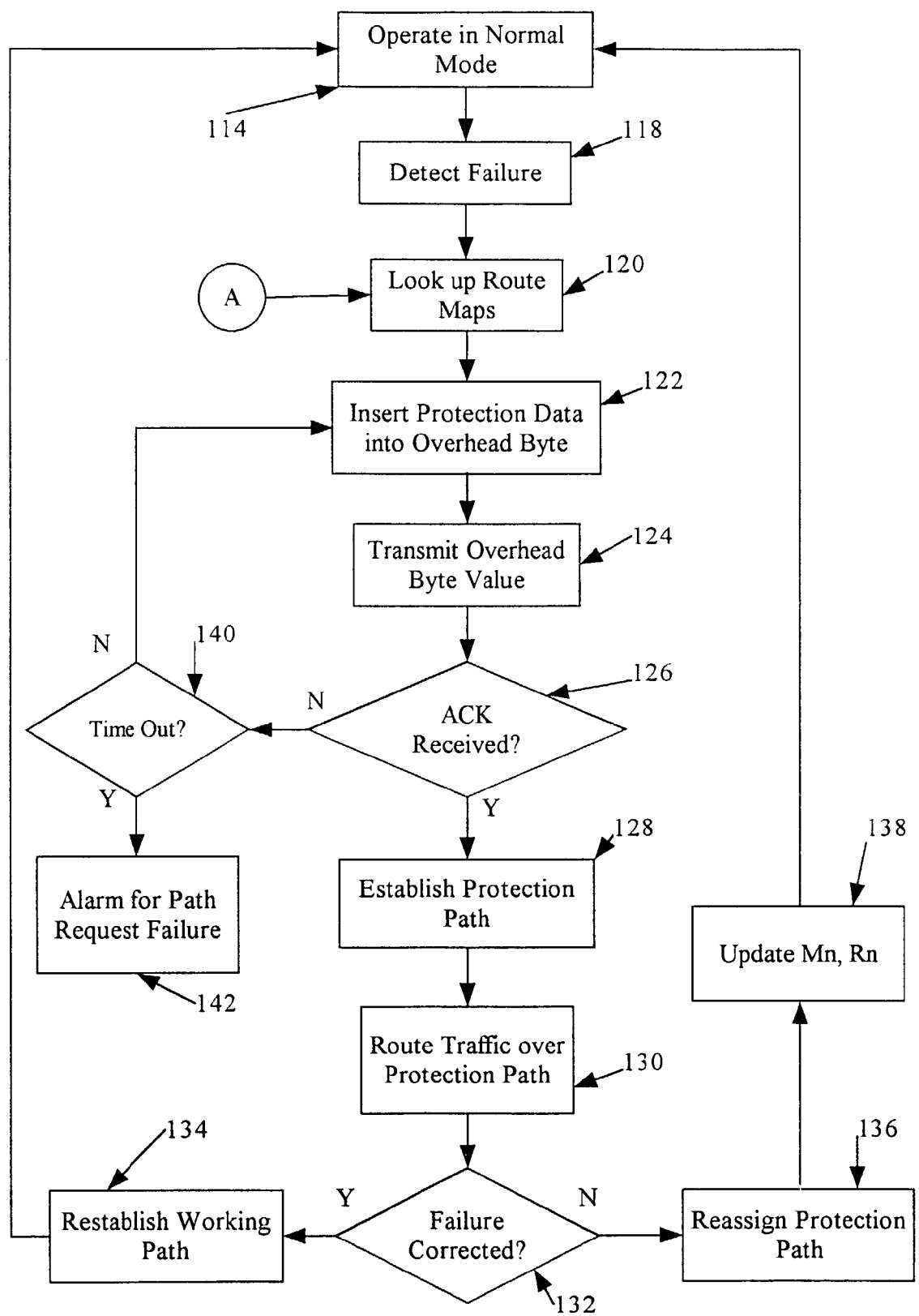

Referring to FIG. 7, the failure mode operation of the sub-network En is described for the global shared protection signaling scheme. From the normal mode of operation at step 114 of FIG. 6, the failure 34 is detected in the path layer 17 of the sub-network En at step 118 by the network elements 14 adjacent to the failure 34. These adjacent network elements 14 look-up the protection entries within their corresponding routing tables Rn at step 120 and insert 122 the protection switching data of their entries into the corresponding K1/K2 byte values (x, y) of the STS-1 frames 200 of the signals 38. Accordingly, the signals 38 with associated values (x, y) are directed 124 to the source network element 14, and then over the protection P path to the destination network element 14 to provide for setup of the protection P path. If the ACK is received by the source network element 14 from the destination network element 14 at step 126, then the defined protection P path contained in the tables Rn is established at step 128 by appropriate switch card 35 reconfiguration. Therefore, the STS-1 frames 200 of the data packets 20 originally destined for transmission on the original failed working W path are redirected 130 along the established protection P path containing the inserted protection bytes K1, K2 until the original working W path is re-established 132, 134 through failure correction. However, in the event that the failure 34 is not corrected within a pre-determined time interval, the protection P path can become the new working W path at step 136 and accordingly alternative protection P paths can be established by updating the maps Mn and tables Rn by the OCCs 28 at step 138 accordingly. Subsequently, the sub-network En can return to normal operation mode at step 114, which can be accomplished through use of the K1/K2 bytes to reestablish the original working W path in much the same way that the now outdated protection P path was established.

Conversely, if the ACK is not received at step 126 when the set-up of the protection P path is attempted, then the K bytes K1, K2 are resent until a timeout occurs 140 or the ACK is finally received, whichever is first. If the timeout at 140 is received, then the corresponding source network element 14 signals an alarm at 142 over the sub-network En to the OCCs in the control layer 15 that the defined protection P path cannot be established. It is further recognized that an alternate $2^{nd}$ choice ($3^{rd}$ etc.) of the protection P paths could be contained within the tables Rn as part of the timeout procedure described above (i.e. as an alternative to the alarm signal transmission).

Accordingly, the content of the K byte message is in the form of (x,y). When the 1:N protection P paths are added to the sub-network En, the protection bandwidth should be reserved and a number can then be allocated to each 1:N group by the K bytes on each corresponding port 33 located between two adjacent network elements 14. Therefore, the K byte message format used in the present protection scheme can be (x,y) where x is the protection group number on the corresponding port 33 and y is the protection group member. It should be noted for each generic port 33 there is a protection routing table Rn for the 1:N traffic potentially carried on that port 33. This measure can reduce the number of look-ups required, since only the protection routing table Rn for a particular port 33 is searched for the appropriate entry. Furthermore, the add/drop ports are indicated by references A, B, C, and D for simplicity in regard to the connections A-B and C-D In addition, the switch cards 35 of the network elements 1, 2, 3, 4, 5, 6 are set-up from the source network elements 1, 3, 6. It is noted that detailed design of particular protection routing data in the routing tables Rn is dependent upon the particular messaging scheme selected and implemented. Furthermore, the use of K1 and K2 bytes for providing desired switching times preferably less than 200 msec is done by way of example only, wherein other suitable overhead bytes in the transport overhead 204 and path overhead 206 could also be used, if desired. Preferably, the overhead bytes selected should be interrupt driven, as to help optimize the resultant switching times. It is further recognized that the preferably less than 200 msec overall protection switching time is with reference to an example 200 network element 14 sub-network En with 3000 km of conduct 16 in both the working W and protection P paths. Accordingly, other desirable switching times can be more or less than the 200 msec reference given, based on the corresponding size of the sub-network En.

The shared mesh protection signaling scheme provides a 1:N protection, i.e. one protection path provides protection facilities for N working paths. Accordingly, the shared protection path scheme can provide for multiple diversely routed working connections A-B, C-D sharing a common protection path 3-4, (see FIG. 4*a*). This protection path can be an STS1 or any of the SONET/SDH combinations such as OC 12/48, as long as the sub-network En infrastructure supports these combinations. Further, one fibre of the conduit 16 can accommodate Dedicated Mesh (l+1), Shared Mesh (working and protection from different 1:N protection groups), Mesh Reroute, Unprotected and Pre-emptable, all on the same fibre. This can help to provide optimised usage of available sub-network En bandwidth.

The shared mesh protection signaling system can provide sharing of the data used during call set-up and data used for restoration once a failure is detected. Accordingly, connection data can be kept by the OCCs 28 in the control layer 17 to provide 1:N connections, so as to help facilitate the set-up of diverse routes for all working W and protection paths P in the 1:N group for signaling between the OCCs 28. It is considered that the call set-up is not time critical in regard to fast protection switching. Furthermore, the restoration or routing data can be stored at the network elements 14 to provide 1:N protection switching The routing data can be kept at the switch cards of the corresponding network elements 14 to provide signaling in the path layer 17 between corresponding network elements 14, with the signaling done using the STS-1 overhead 204, 206. It is noted that typically the respective hardware of network elements 14, such as the switch cards 35, have interrupt driven priority access to some of the overhead bytes, such as but not limited to the K1/K2 byte values, and can therefore dynamically act on the protection signaling information contained therein independently of OCC 28 involvement. It is considered that minimizing restoration time is critical in protection signaling systems.

A further embodiment of the sub-network En, shown in FIG. 8, is now referenced to describe the local shared protection signaling scheme. The sub-network En has eight network elements 14 in the path layer 17, as indicated by reference numerals 1,2,3,4,5,6,7, and 8 respectively. An example representation of the control layer 15 contains the corresponding series of OCCs 28 coupled together by links 32, wherein each OCC 28 corresponding to each network element 14 is indicated by OCC1 to OCC8 respectively. The OCCs 28 communicate with the individual network elements 14 though a series of links represented generically by reference numeral 31. The routing tables R1,R2,R3,R4,R5,R6,R7, and R8 are similar in data content and function to those discussed in connection with FIGS. 4*a,b,c*, whereby working connection A-B is source routed by network element 1, working connection C-D is source routed by network element 6, and working connection E-F is source routed by network element 3. Therefore, network elements 2, 4, and 5 can be regarded as destination elements for their respective connections A-B, E-F, and C-D. It is noted that the working W paths can contain one or more working links, while the shared protection segments of the sub-network En can include at least one protection link. Protection P paths can comprise one or more of the shared protection links.

The path layer 17 of the sub-network En contains, for example, the three working W paths represented by solid line paths, namely working connection A-B with network elements 1,7,8,2, working connection C-D with network elements 5,6, and working connection E-F with network elements 3,4. Further, when the sub-network En was established, the working connection A-B was assigned a protection P path indicated by the dotted line path 1-3-4-2 consisting of protection segments 1-3, 3-4, and 4-2, the working connection C-D was assigned a protection P path indicated by the dotted line path 5-3-4-6 consisting of protection segments 5-3, 3-4, and 4-6, and the working connection E-F was assigned a protection P path indicated by the dotted line path 3-1-7-8-2-4 consisting of protection segments 3-1, 1-7, 7-8, 8-2, and 2-4. Accordingly, the working connections A-B and C-D share the protection segment 3-4 situated between the network elements 3 and 4. It is recognized the number of working and protection channels on each working connection A-B, C-D, E-F and corresponding protection P paths are dependent upon the particular OC-N format and capabilities used by the sub-network En. It should be noted that protection segment 7-8 is separate from the assigned protection P path 1-3-4-2 for the working connection A-B.

Figure 9:
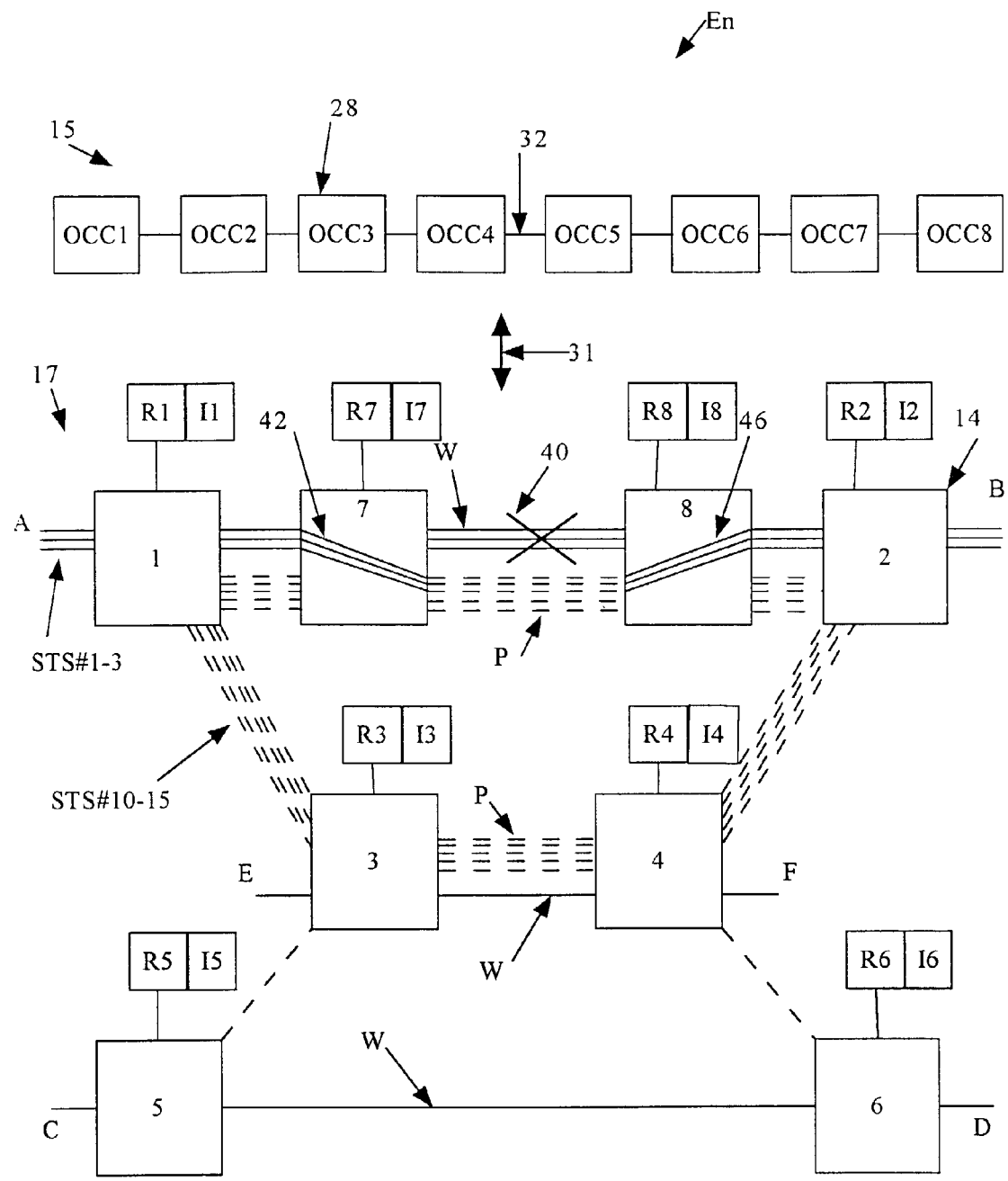
FIG. 9 shows a failure mode for the sub-network of FIG. 8.

Referring to FIG. 9, a line failure 40 has occurred on the working segment 7-8. Therefore, all channels configured on the working segment 7-8 are no longer available for transmission of the data packets 20 (see FIG. 2) between the source network element 1 and destination network element 2. It should be noted that, for exemplary purposes only, working connection A-B is further denoted in FIG. 9 as having assigned working channels STS#1, STS#2, and STS#3 for transmission of the data packets 20 between the source network element 1 and destination network element 2. The protection P path 3-1-7-8-2-4, including protection segment 7-8, and protection P path 1-3-4-2 have also been further subdivided to have available protection channels STS#15 to STS#20 inclusive, for exemplary purposes only.

Figure 10:
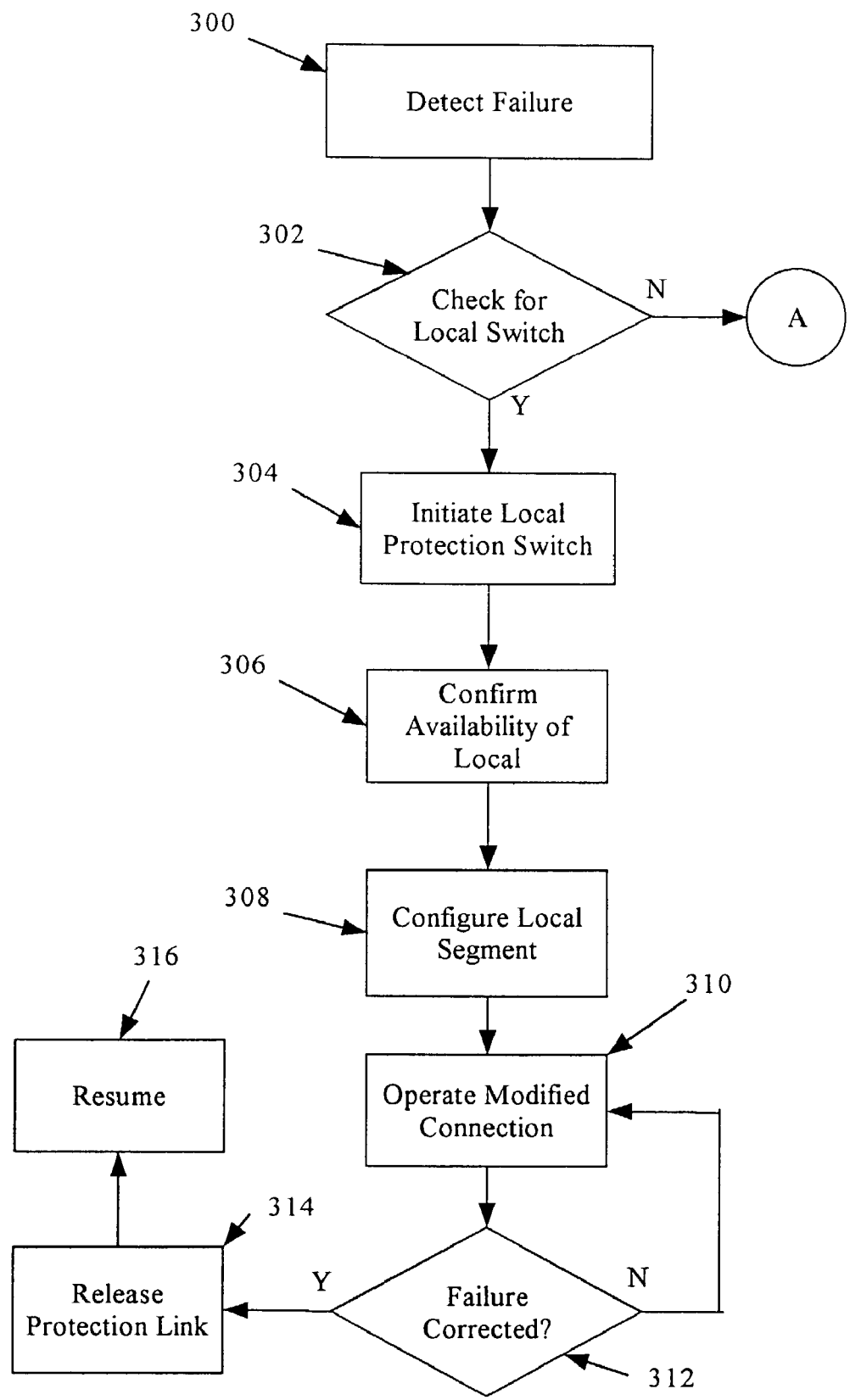
FIG. 10 is an operational flowchart of the sub-network of FIG. 9.

However, contrary to the global routed protection signalling scheme discussed above with reference to FIG. 5, the alternate locally routed protection signalling scheme is now described. Referring to FIGS. 9 and 10, the failure 40 is first detected at step 300 by the SONET layer of the adjacent network element 8, as for example the network element 8 is the node at which the working channels STS#1-3 are destined. The control unit 37 (see FIG. 4*a*) of the network element 8, under the global protection scheme, would further operate to determine appropriate protective routing table Rn data corresponding to the detected failure 34. However, under the local protection scheme, before inserting the protection switching contained in data of the routing table R8 within the overhead 204, 206 (see FIGS. 3*a* and 3*b*) of the STS-1 frame 200, an identification module 18 of network element 8 checks locally 302 to see if there are any available local protection channels between itself and the network element 7 located on the opposite side of the failure 40. The identification modules. In contain a listing of potential protection channels present between adjacent network elements 14. If adequate local protection channels are available (i.e. in this case any of the channels STS#10-15 on protection segment 7-8), then the network element 8 will attempt to initiate a local protection switch 42 at step 304. This local protection switch can be defined as protection switching (done by the local source network element 7) and subsequent switch selection (done by the local destination network element 8) upon confirmation of the intended local switch by the affected network elements 7,8 on either side of the failure 40. It should be noted that the other network elements 14 have corresponding identification modules I1, I2, I3, I4, I5, I6, and I7 (In) respectively.

Accordingly, after the failure 40 has been detected by the network element 8, network element 8 becomes the switching node according to standard SONET switching protocols. The network element 8 then inserts the appropriate K1 and K2 byte indications into the SONET line overhead 204, 206, for transmission on any of the potentially available protection channels STS#10-15 of the protection segment 7-8, to transport the required protection switch request 44 to the network element 7. A scheme selection function of the identification module I8 confirms that the local protection channels STS#10-15 are available on the local protection segment 7-8. After confirmation, the scheme selection function selects the local protection switching scheme over the global scheme and the network element 7 executes the local protection switch 42 by the switch card 35 to redirect any incoming data packets 20 away from the failed working path channels STS#1-3 on working segment 7-8, and sends an ACK of the switch request received from network element 8, along with an indication of the protection channels selected from those available A channel selection function of the identification module I7 selects a portion STS#13-15 of the available protection channels STS#10-15 to help maximize local network bandwidth efficiency. Network element 7 is now setup to cross connect all incoming data packets 20, originally destined out from network element 7 on the working channels STS#1-3 of working segment 7-8, onto the selected protection channels STS#15-18 of protection segment 7-8 destined to network element 8.

It is recognized that the network element 8, after receiving the ACK from the network element 7 and confirmation of the selected protection channels (STS#15-18), will choose to receive the data packets 20 by a switch selection 46. The network element 8 also configures 308 the switch selection 46 by it's switch card 35 to direct any potential data packets 20 from the protection channels STS#15-18 of protection segment 7-8 back to the original working channels STS#1-3 on the working segment 8-2 of the working connection A-B. Accordingly, neither the source network element 1 nor the destination network element 2 were directly involved in the local switches 42, 46, and therefore continue to transmit and receive the data packets to the original working segment 1-7 and from the original working segment 8-2, respectively, of the initially established working connection A-B. Further, it is recognized that switching 42 and switch selection 46 of working channels STS#1-3 onto protection channels STS#15-18 is irrespective as to whether the network traffic is present on the working connection A-B.

Therefore, as a result of the detected failure 40, the modified working W-protection P path for the original working connection A-B now consists of the original network elements 1, 7, 8, and 2, except the segments now utilized are the working segment 1-7, a portion of the protection segment 7-8, and the working segment 8-2 The modified working connection A-B now contains a locally protected segment (i.e. protection segment 7-8) and the entire protection P paths 1-3-4-2 and 5-3-4-6 remain available for the recovery of other potential failures, such as on the working connection C-D. It is noted that this local or segment switching for mesh networks could be 1:N or M:N and can provide advantages similar to span switching in ring networks. This is compared to the previously described global protection signaling scheme which can provide advantages in mesh networks similar to the ring/path switching in ring networks.

The network elements 7,8 continue to monitor 312 for correction of the failure 40. Once the line failure 40 is corrected, the network elements 7,8 execute a reverse procedure to that described above in order to release 314 the assigned protection channels STS#15-18 of the protection segment 7-8 and remove the protection switch 42 and switch selection 46. This places the protection channels STS#15-18 of protection segment 7-8 back on to the original working channels STS#1-3 of the working segment 7-8 utilizing appropriate SONET switching protocols (such as first removing the destination end switch selection 46 following a wait to restore period), and then the transmission of the data packets 20 resumes 316 along the working connection A-B as per the pattern shown in FIG. 8. It is recognised that working channels other than the original STS#1-3 configuration could be utilized on the working W path 1-7-8-2, if desired, once the line failure 40 has been corrected.

However, if no local protection channel is available at step 302 between the two network elements 7,8, as confirmed by the scheme selection function of the identification module 18, then the protection signal 38 (see FIG. 5) containing the failure indication with an appropriate K byte value (x,y) is propagated at step 120 (of FIG. 7) to the source network element 1, as per the above described global protection signalling scheme with reference to FIGS. 5, 6, and 7. Accordingly, when the network elements 7,8 confirm that no local protection channels are available at step 302 of FIG. 10, step 120 and subsequent steps of FIG. 7 (indicated by connector "A") are followed by the affected network elements 14 to implement the global protection signalling scheme.

It should be noted that the above-described local protection switching scheme uses only a portion of the locally available protection channels, if permitted, as compared to all available protection channels. This ability of the channel selection function of the identification modules In helps to support asymmetrical working versus protection capacity for increasing bandwidth efficiency on the sub-network En, as well as make unused protection bandwidth available to provide protection for subsequent failures occurring on the other working connections C-D, E-F. It is also recognized that the usage of the portion of protection channels STS#15-18 could be reported by the network elements 7,8 to the OCCs 28 and/or the affected network elements 14 of the adjacent working connections C-D and E-F, which may require usage of some or all of the assigned protection P path 1-7-8-2, if shared. Accordingly, the routing tables Rn and identification modules In could be updated subsequently to the set-up of the local protection switch 42 and switch selection 46 to reflect usage of the local protection channels STS#15-18 on the protection segment 7-8 It is also recognized that the routing tables Rn and identification modules In could be combined as one table/module.

Further, it is recognized that the local protection switching scheme does not have to use the group and member numbers in the K1/K2 bytes, as done in the global scheme. Rather, the interrupt driven bytes are used by the local scheme to determine if bandwidth is available for local protection switching.

In regard to the quality of path sizes in diverse routing applications for both the local and global protection signaling schemes, it is also possible to mix different sizes of the 1:N protection groups. For instance, a smaller one will fit in a larger one (many STS-1s into one OC48c). However, concatenated payloads can start at certain STS-1 boundaries, such as OC12c starts at STS-1, STS-13, etc. Accordingly, mixing of 1:N groups can also feature to optimize protection bandwidth by analysing on a segment-by-segment basis which protection groups can share protection bandwidth, through updating of the routing tables Rn stored at the network elements 14.

It should be noted that one working W path can have many protection groups, each with many members For example link "1" between two network elements 14 can have three protection groups, with each five members. Link "2" between these two same network elements 14 can have another 2 protection groups with each 3 members, while link 3 between these same network elements 14 may not have any 1:N protection groups. The corresponding OCC 28 needs to keep track of the 1:N protection groups assigned at each link and the number of members in the protection groups. The OCC 28 must help to ensure that in a 1:N protection group there are never more than N members in the protection group. Furthermore, the value of N is defaulted for each working W path and can be changed through the suitable user interface 23 coupled to the integrated management system 22 The value of N is only valid for a particular link. For instance, N could be fixed to its default value or N can be changed, but only on a trunk (bundle of links between two nodes) basis.

It is recognized that conduits 16 having the same source and destination network elements 14 (for instance 1 and 2 in FIG. 5) can make use of a more optimized global protection signaling scheme. For instance, if there are 23 STS1 1:N conduits 16 sourced at network element 1 and terminated at network element 2, and all are protected by network elements 1-3-4-2 (using 23 STS-1's), only 1 K-byte message (x, y) transmitted from the source network element 1 to network element 3 can suffice to indicate that all 23 STS-1 need be protection switched. This could require addition information at the corresponding network elements 14 to map the one message to the 2-3 connection requests.

Due to the provision of shared protection P paths in both the local and global protection switching schemes, it is feasible that collisions for access to those paths P can occur. Referring to FIGS. 4a and c, one way to help misconnections and collisions is to send the protection switch request from the source network element 1 to the corresponding destination network element 2 to reserve the protection bandwidth, while the actual switch actions are done when receiving an acknowledgement (ACK) from the destination network element 2 and working its way back to the source network element 1. The acknowledgement should be associated with the protection switch request and should use the corresponding routing tables Rn as well as send the correct K byte (x,y) values of the protection signals 38 backwards. Accordingly, the routing tables Rn should also be reserved for a reverse lookup. For instance, with the failure 34 between the working connection A-B in FIG. 4a, network element 2 will send the acknowledgement (1,1) back to network element 4 Network element 4, then using its corresponding routing table R4 finds that this acknowledgement needs to be sent onto port P1 with a value of 1,1. It should be noted that this can be deduced by reading the first entry in the protection table R4 at network element 4 in the reverse order.

In reference to FIG. 5 in regard to collision behaviour, after the segment failure 34 has been detected, the source elements 1, 3, 6 will start routing K1 and K2 bytes to allocated protection P paths. The race to get access to the 1:N protection P paths can be considered unpredictable. For example, if both the working W paths A-B and C-D fail in a double failure mode, network element 1 will start the race for providing the protection P path to protect working connection A-B and network element 6 will do the same for working connection C-D. Somewhere between the network elements 3 and 4 a collision can be expected. Therefore, either the working connection A-B gets the protection P path between network elements 3-4 or working connection C-D is awarded the corresponding protection P path. Therefore, one of the protection P path network elements 3, 4 needs to back off with a Not Acknowledgement (NACK) sent back to the corresponding source network element 1, 6.

Furthermore, the above described collision circumstance also provides insight into a misconnection scenario. Accordingly, when network element 1 and network element 3 set-up the protection path to protect working connection A-B, and network element 6 and network element 4 do the same for working connection C-D, the collision can happen between network elements 3 and 4, and network element 1 will then be temporarily connected to network element 3 until the collision gets resolved. Therefore, a forward reservation of the protection path can be provided for through forward reservation and activation of the switch request on receiving the acknowledgement sent in the reverse direction This can have an impact on the switching times.

It is further recognized that above described local and global protection switching schemes can be applied on other optical network formats, such as Optical Transport Networks (OTN) based on Dense Wavelength Division Multiplexing (DWDM). DWDM is an enabling technology that can provide connections between service layer elements of the optical network at higher speeds on the existing fiber plant, and thus provide the next step in the evolution of the transport infrastructure. A DWDM-based OTN can provide high capacity per fiber, as well as high capacity per connection. Each DWDM wavelength provides a connection that can carry a number of protocols with a bit-rate ranging from 50 Mb/s to 2.5 Gb/s and beyond. These wavelengths can be multiplexed with other wavelengths and added, dropped and cross-connected at the optical level, helping to eliminate the need to manage the bandwidth at a lower granularity when it is not necessary. In OTN, a wavelength is not constrained by a fixed-rate timeslot in a pre-defined multiplex protocol, and it can carry a number of protocols, such as SONET, ESCON, FDDI, and Ethernet, and any bit-rate, such as 150 Mbs, 1.25 Gb/s and 2.5 Gb/s. The flexibility of the DWDM-based OTN derives from the protocol and bit-rate independence of the traffic-carrying wavelengths Protocol and bit-rate independence is a key advantage of DWDM that enables optical transport networks to carry many different types of traffic over an optical channel regardless of the protocol (Gigabit Ethernet, ATM, SONET, asynchronous FOTS, etc.) or bit-rate (150 Mb/s, 1.25 Gb/s, 2.5 Gb/s, etc.). Accordingly, the interrupt driven overhead bytes of the OTN can also be used to implement the above described local and global protection switching systems.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. In a mesh network, a network element for providing protection switching in a 1:N shared mesh protection scheme having a first protection path associated with a pair of working paths selected from the N working paths, the network element comprising:
- a) a link for connecting the network element to a first working path of the pair of working paths in a path layer of the network, the path layer including a plurality of interconnected network elements;
- b) a routing table accessible by the network element, the routing table for having local protection channel information associated with a local protection segment separate from the first protection path, the local protection segment connecting the network element and one of the interconnected network elements adjacent to the network element; and
- c) an identification module for using the local protection channel information to identify an available protection channel on the local protection segment in the event of failure of a local working segment of the first working path, the local working segment connecting the network element and said one of the adjacent interconnected network elements;

wherein the available local protection channel on the local protection segment is used to switch local network bandwidth from the failed local working segment to the local protection segment after the network failure has been detected; and wherein the protection channel information includes a listing of a plurality of local protection channels associated with the local protection segment;

said network element further comprising a channel selection function of the identification module to select a portion of the available protection channels from the list, the portion selected to match the bandwidth requirements of the failed local working segment.

2. The network element according to claim 1, wherein a second protection path is associated with the N working paths to provide a M:N shared mesh protection scheme.

3. In a mesh network, a network element for providing protection switching in a 1:N shared mesh protection scheme having a first protection path associated with a pair of working paths selected from the N working paths, the network element comprising:
- d) a link for connecting the network element to a first working path of the pair of working paths in a path layer of the network, the path layer including a plurality of interconnected network elements;
- e) a routing table accessible by the network element, the routing table for having local protection channel information associated with a local protection segment separate from the first protection path, the local protection segment connecting the network element and one of the interconnected network elements adjacent to the network element; and
- f) an identification module for using the local protection channel information to identify an available protection channel on the local protection segment in the event of failure of a local working segment of the first working path, the local working segment connecting the network element and said one of the adjacent interconnected network elements;

wherein the available local protection channel on the local protection segment is used to switch local network bandwidth from the failed local working segment to the local protection segment after the network failure has been detected; and further comprising a scheme selection function of the identification module to select the first protection path after confirming the local protection segment is not available for switching the local network bandwidth.

4. The network element according to claim 3 wherein the routing table includes protection routing information associated with the first protection path and the N working paths.

5. The network element according to claim 4 further comprising a first identifier assignable to the first protection path and a second identifier assignable to each of the N working paths, the identifiers associated with the protection routing information.

6. The network element according to claim 5 further comprising a failure value for providing to at least one of the interconnected network elements adjacent to the network element the first identifier and the second identifier relatable to the failure.

7. The network element according to claim 6, wherein the failure value is adapted for insertion into an interrupt driven overhead byte of a protection signal for transmission over the mesh network for communication between the interconnected network elements and the network element.

8. The network element according to claim 7, wherein the failure value is adapted for communication in the overhead byte of the protection signal to help establish the first protection path after the failure has been detected in the local working segment of the first working path.

9. The network element according to claim 8, wherein the failure value is adapted for use in the protection signal selected from the group comprising: a switch request, an acknowledgement of a switch request, a negative acknowledgement of a switch request, a revert back to working request, and an acknowledgement of a revert back to working request.

10. The network element according to claim 5, wherein the first identifier is a first byte of a pair of overhead bytes and the second identifier is a second byte of the pair of overhead bytes.

11. The network element according to claim 10, wherein the first byte is selected from one of a K1-K2 byte pair and the second byte is selected from the other one of the K1-K2 byte pair.

12. The network element according to claim 4, wherein the protection routing information contained in the routing table is defined when the N working paths of the path layer are established.

13. The network element according to claim 12, wherein the protection routing information contained in the routing table is supplied by a controller associated with the network element.

14. The network element according to claim 12, wherein the protection routing information is distributed in the path layer of the mesh network.

15. In a mesh network, a method for providing protection switching in a 1:N shared mesh protection scheme having a first protection path associated with a pair of working paths selected from the N working paths, the method comprising the steps of:
- a) interconnecting a network element to a first working path of the pair of working paths in a path layer of the network, the path layer including a plurality of interconnected network elements;
- b) defining a routing table accessible by the network element, the routing table having local protection channel information associated with a local protection segment separate from the first protection path, the local protection segment connecting the network element and one of the interconnected network elements adjacent to the network element;
- c) identifying by the network element a failure of a local working segment of the first working path, the local working segment connecting the network element and said one of the adjacent interconnected network elements;

d) using the local protection channel information by the network element to identify an available protection channel on the local protection segment;

e) switching local network bandwidth from the failed local working segment to the available protection channel on the local protection segment;

f) storing in the protection channel information a listing of a plurality of local protection channels associated with the local protection segment; and g) selecting a portion of the plurality of local protection channels from the listing.

16. The method according to claim 15, wherein the portion is selected to match the bandwidth requirements of the failed local working segment.

17. The method according to claim 15 further comprising the step of selecting the first protection path after confirming the local protection segment is not available for switching the local network bandwidth.

18. The method according to claim 17 further comprising the step of storing in the routing table a protection routing information associated with the first protection path and the N working paths.

19. The method according to claim 18 further comprising the step of assigning a first identifier to the first protection path and assigning a second identifier to each of the N working paths, the identifiers associated with the protection routing information.

20. The method according to claim 19 further comprising the step of propagating a failure value to at least one of the interconnected network elements adjacent to the network element, the failure value including the first identifier and the second identifier relatable to the failure of the first working path.

21. The method according to claim 20 further comprising the step of inserting the failure value into an interrupt driven overhead byte of a protection signal for transmission over the mesh network for communication between the interconnected network elements and the network element.

22. The method according to claim 21 further comprising the step of communicating the failure value in the overhead byte of the protection signal to help establish the first protection path after the failure has been detected in the local working segment of the first working path.

23. The method according to claim 22, wherein the protection signal is selected from the group comprising: a switch request, an acknowledgement of a switch request, a negative acknowledgement of a switch request, a revert back to working request, and an acknowledgement of a revert back to working request.

24. The method according to claim 19, wherein the first identifier is a first byte of a pair of overhead bytes and the second identifier is a second byte of the pair of overhead bytes.

25. The method according to claim 19, wherein the first byte is selected from one of a K1-K2 byte pair and the second byte is selected from the other one of the K1-K2 byte pair.

26. The method according to claim 18 further comprising the step of defining the protection routing information contained in the routing table when the N working paths of the path layer are established.

27. The method according to claim 26 further comprising the step of providing the protection routing information contained in the routing table by a controller associated with the network element.

28. The method according to claim 26, wherein the protection routing information is distributed in the path layer of the mesh network.

29. The method according to claim 15 wherein a second protection path is associated with the N working paths to provide a M:N shared mesh protection scheme.

* * * * *